(12) United States Patent
Dubey et al.

(10) Patent No.: US 11,989,165 B2
(45) Date of Patent: May 21, 2024

(54) SERVER SYSTEMS AND METHODS FOR MERCHANT DATA CLEANSING IN PAYMENT NETWORK

(71) Applicant: MASTERCARD INTERNATIONAL INCORPORATED, Purchase, NY (US)

(72) Inventors: Shashank Dubey, Madhya Pradesh (IN); Gaurav Dhama, Haryana (IN); Ankur Arora, Delhi (IN); Vikas Bishnoi, Rajasthan (IN); Ankur Saraswat, Haryana (IN); Hardik Wadhwa, Bangalore (IN); Yatin Katyal, Haryana (IN); Debasmita Das, West Bengal (IN)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 0 days.

(21) Appl. No.: 17/879,680

(22) Filed: Aug. 2, 2022

(65) Prior Publication Data
US 2023/0047717 A1 Feb. 16, 2023

(30) Foreign Application Priority Data
Aug. 4, 2021 (IN) .............................. 202141035129

(51) Int. Cl.
G06F 16/215 (2019.01)
G06F 16/23 (2019.01)
G06F 16/25 (2019.01)

(52) U.S. Cl.
CPC ........ *G06F 16/215* (2019.01); *G06F 16/2365* (2019.01); *G06F 16/258* (2019.01)

(58) Field of Classification Search
CPC ... G06F 16/215; G06F 16/2365; G06F 16/258
See application file for complete search history.

(56) References Cited

U.S. PATENT DOCUMENTS 8,219,550 B2 7/2012 Merz et al.
8,458,071 B2 6/2013 Martin et al.
(Continued)

*Primary Examiner* — Kuen S Lu
(74) *Attorney, Agent, or Firm* — LOZA & LOZA, LLP

(57) ABSTRACT

Embodiments provide methods and systems for merchant data cleansing in payment network. Method performed by server system includes accessing electronic payment transaction records from transaction database. Each electronic payment transaction record includes merchant data fields. Method includes determining set of electronic payment transaction records with ambiguous merchant data fields having matching probability scores less than predetermined threshold value computed by probabilistic matching model and identifying at least one issue for non-matching of each of set of electronic payment transaction records. Method includes determining data model based on at least one issue of each of set of electronic payment transaction records. Data model is one of: phone-to-city model, payment aggregator model, and merchant name normalization model. Method includes updating set of electronic payment transaction records with unambiguous merchant data fields corresponding to ambiguous merchant data fields by applying data model to each of set of electronic payment transaction records.

15 Claims, 13 Drawing Sheets

(56) References Cited

U.S. PATENT DOCUMENTS

| | | | |
|---|---|---|---|
| 8,768,802 B2 | 7/2014 | Engle et al. | |
| 8,805,737 B1* | 8/2014 | Chen | G06Q 40/00 |
| | | | 235/380 |
| 9,026,552 B2 | 5/2015 | Jagota | |
| 9,286,618 B2 | 3/2016 | Lo Faro et al. | |
| 10,521,866 B2 | 12/2019 | Lo Faro | |
| 2007/0233615 A1* | 10/2007 | Tumminaro | H04L 63/08 |
| | | | 705/75 |
| 2014/0358771 A1* | 12/2014 | Ali | G06Q 20/22 |
| | | | 705/39 |
| 2015/0019394 A1 | 1/2015 | Unser et al. | |
| 2017/0004487 A1* | 1/2017 | Hagen | G06Q 20/4016 |
| 2019/0236601 A1 | 8/2019 | Izenson et al. | |
| 2020/0210833 A1* | 7/2020 | Xu | G06N 7/01 |
| 2021/0012306 A1* | 1/2021 | Chen | G06Q 20/3278 |
| 2021/0182855 A1* | 6/2021 | Nair | G06Q 20/407 |

* cited by examiner

SERVER SYSTEMS AND METHODS FOR MERCHANT DATA CLEANSING IN PAYMENT NETWORK

CROSS-REFERENCE TO RELATED APPLICATIONS

The present application for Patents claims priority to India Patent Application number 202141035129, filed Aug. 4, 2021, and which is incorporated by reference hereto, and which also assigned to assignee hereof.

TECHNICAL FIELD

The present disclosure relates to artificial intelligence processing systems and, more particularly to, electronic methods and complex processing systems for updating merchant data (such as, merchant location, merchant name, etc.) associated with a merchant in a payment network through the use of artificial intelligence models.

BACKGROUND

With ever-increasing advancement in payment technology, the amount of transaction data available has increased manifold. The transaction data houses meaningful information that provides detailed insights into business and stakeholders. Data analytics of the transaction data may provide a range of information such as, patterns in sales that may be used for strategizing, chalking business plans, devise marketing plans for improving the business. Merchant information forms a vital part of the transaction data. The merchant information includes a plurality of merchant attributes such as merchant name, merchant address, and a merchant identifier. The payment network captures the merchant information sent out by the acquirer while processing a transaction through its network. However, this merchant information is very limited and needs to be matched to a clean merchant database of merchants to perform data analytics or mining on the transaction dataset.

In general, the transaction data received from acquirers are organized and stored in a database. During the organization, transaction data associated with different merchant locations of the same merchant are aggregated together. For example, stores at a different geographical location associated with a brand are grouped. However, the transaction data received by an acquirer from multiple Point of Sale (POS) terminals display variations of merchant name and/or the geographical location of the merchant. This may arise due to errors in initializing or calibrating the POS terminals at the merchant side. Such variations in merchant names and addresses affect the organization of the transaction data in the database. For example, in some transaction records, the city name field is populated with a merchant phone number or any alphanumeric numbers.

Conventionally, such aggregation of merchant locations is performed using a rule-based system. The rule-based system employs an n-request process and includes a lot of manual efforts. The aggregation of unconventional merchant names that include emoticons, pictures, and special characters using the rule-based system gets even more challenging due to optimization problems. Further, the rule-based system involves the usage of third-party data and hand-written rules to include the merchant locations to the aggregate merchant that results in false positives during the aggregation process.

However, the merchant information embedded in the payment transaction data is not always clean enough to provide a confident match in the clean merchant database. The payment transaction data may include noisy data that distorts the merchant information. This noisy data primarily occurs during data collection, storage, and processing at the end of the acquirer or the payment aggregator who are responsible for sending the payment transaction information. Some payment transaction data include merchant information that is so ambiguous that it may be difficult even for a human annotator to correctly match with a set of candidate merchant records.

Thus, there exists a need for a technical solution of modifying ambiguous/noisy merchant data in electronic payment transactions using automated means, through the use of various data models.

SUMMARY

Various embodiments of the present disclosure provide methods and systems for updating merchant information of electronic payment transaction records using one or more data models.

In an embodiment, a computer-implemented method is disclosed. The computer-implemented method performed by a server system includes accessing a plurality of electronic payment transaction records associated with a plurality of merchants from a transaction database. Each of the plurality of electronic payment transaction records includes merchant data fields associated with a merchant of the plurality of merchants. The method includes determining a set of electronic payment transaction records with ambiguous merchant data fields. Each of the set of electronic payment transaction records from the plurality of electronic payment transaction records has a matching probability score less than a predetermined threshold value. The matching probability score is computed by a probabilistic matching model. The method includes identifying at least one issue for non-matching of each of the set of electronic payment transaction records and determining at least one data model based, at least in part, on the at least one issue of each of the set of electronic payment transaction records. The at least one data model is one of: phone-to-city model, payment aggregator model, and merchant name normalization model. The method further includes updating the set of electronic payment transaction records with unambiguous merchant data fields corresponding to the ambiguous merchant data fields by applying the at least one data model to each of the set of electronic payment transaction records.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which.

Figure 1:
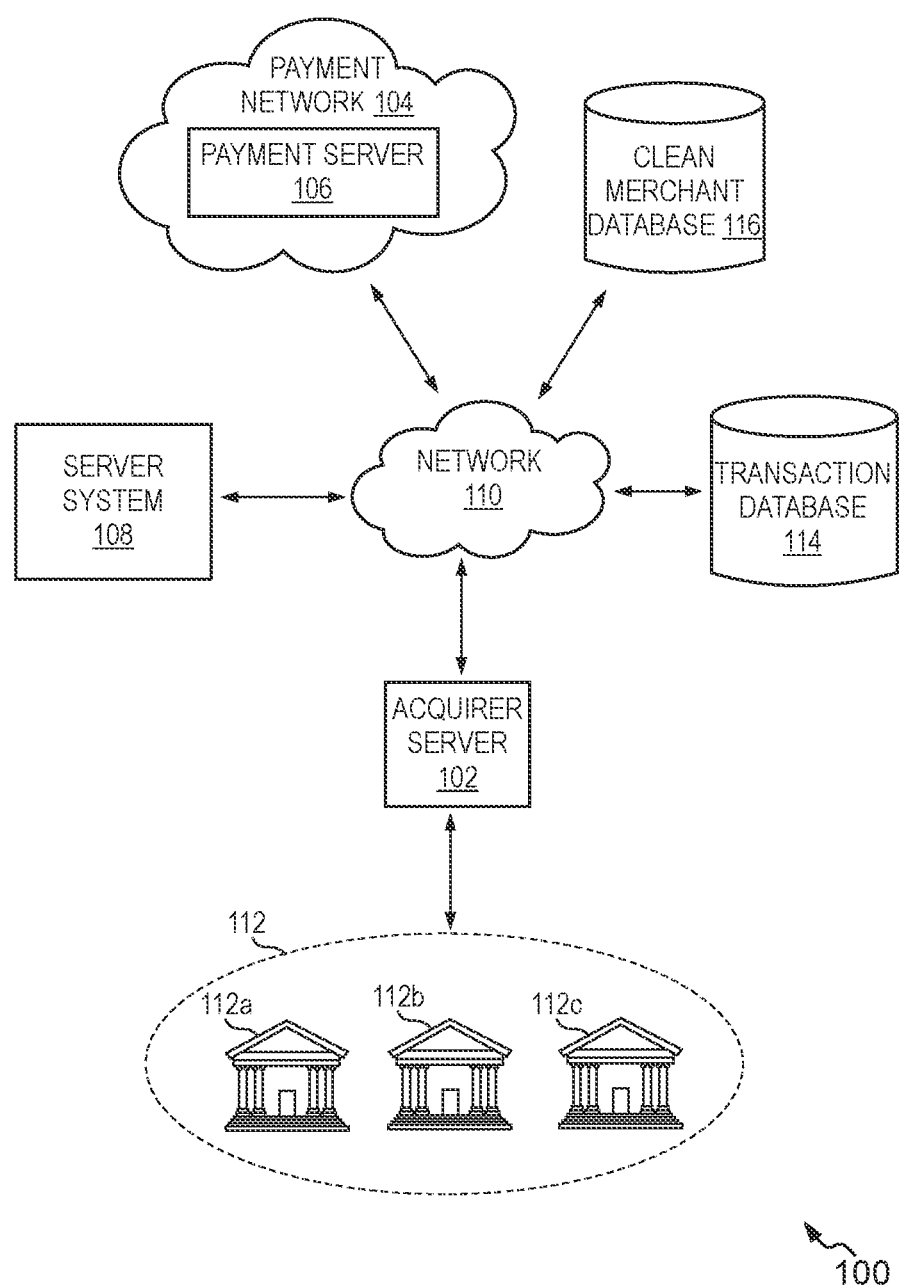
FIG. 1 is an example representation of an environment, in which at least some example embodiments of the present disclosure can be implemented.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "acquirer" is an organization that transmits a purchase transaction to a payment card system for routing to the issuer of the payment card account in question. Typically, the acquirer has an agreement with merchants, wherein the acquirer receives authorization requests for purchase transactions from the merchants, and routes the authorization requests to the issuers of the payment cards being used for the purchase transactions. The terms "acquirer", "acquiring bank", "acquiring bank" or "acquirer bank" will be used interchangeably herein. Further, one or more server systems associated with the acquirer are referred to as "acquirer server" to carry out its functions.

The term "payment network", used herein, refers to a network or collection of systems used for the transfer of funds through the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by such as, Mastercard®.

The term "merchant", used throughout the description generally refers to a seller, a retailer, a purchase location, an organization, or any other entity that is in the business of selling goods or providing services, and it can refer to either a single business location, or a chain of business locations of the same entity. Further, the term "aggregated merchant name", used throughout the description, refers to a standard merchant name of a merchant despite variations shown by different franchisee outlets or different merchants (merchant at different geographical locations). The information associated with such aggregated merchant is 'pre-defined' and stored in a database available at a server system.

Overview

Various embodiments of the present disclosure provide methods, systems electronic devices and computer program products for merchant data cleansing in a payment network. More specifically, embodiments of the present disclosure provide an end-to-end process for modifying merchant data fields present in electronic payment transaction records of merchants and matching the electronic payment transaction records with a clean merchant database, thereby allowing analysts to perform data analytics or mining on transaction dataset. Such techniques for identifying ambiguous data in electronic payment transaction records help to eliminate incorrect entries in a database.

In an example, the present disclosure describes a server system that updates merchant information of electronic payment transaction records using one or more data models. The server system includes at least a processor and a memory. In one non-limiting example, the server system is a payment server. The server system is configured to access the plurality of electronic payment transaction records associated with a plurality of merchants from a transaction database. Each electronic payment transaction record includes at least merchant data fields associated with a merchant of the plurality of merchants. In an embodiment, the server system is configured to extract the merchant data fields from each of the plurality of electronic payment transaction records. The merchant data fields include, but are not limited to, merchant name, merchant contact number, merchant acquirer ID, merchant address (e.g., door number, street name and/or number), merchant city, merchant state code, merchant zip code, and merchant country code. The merchant data fields include categorical and numerical data.

For example, merchant contact number is numerical data and merchant city is categorical data. The server system is configured to pre-process the merchant data fields by applying predefined ruleset over the plurality of electronic payment transactions.

In one embodiment, the server system is configured to find transaction records from the plurality of transaction records with an exact match with clean merchant records in a clean merchant database. In one embodiment, the server system is configured to apply an adaptive blocking algorithm for matching. Thereafter, the server system is configured to perform address normalization over non-matched transaction records and clean merchant records stored in the clean merchant database.

The server system is configured to again match the non-matched transaction records with clean merchant records stored in the clean merchant database after the address normalization. The server system is also configured to train a probabilistic matching model (e.g., logistic regression model) in a semi-supervised manner based on matching features of matching pairs generated during the matching step. The probabilistic matching model is configured to provide a matching probability score for a payment transaction record.

In one embodiment, the server system is configured to identify a set of electronic payment transaction records with ambiguous merchant data fields. Each of the set of electronic payment transaction records has a matching probability score less than a predetermined threshold value. Then, the server system is configured to identify at least one issue for non-matching of each of the set of electronic payment transaction records. Based on the identified issues, the set of electronic payment transaction records can be divided into first, second, and third electronic payment transaction records. The at least issue can be one of: phone number in a city name field, payment aggregators sending the ambiguous merchant data fields, and ambiguous merchant name in the merchant name field. The server system is configured to determine at least one data model from one or more data models for each of the set of electronic payment transaction records based on the at least one issue for non-matching. The one or more data models include phone-to-city model, payment aggregator model, and merchant name normalization model.

For example, in a payment transaction record, city name field is populated with phone number of a merchant and the merchant name field is filled with payment aggregator name concatenated with a random character string. In this case, the phone-to-city model and payment aggregator model need to be applied for updating the payment transaction record.

In one embodiment, the server system is configured to update the set of electronic payment transaction records with unambiguous merchant data fields corresponding to ambiguous merchant data fields by applying the at least one data model to each of the set of electronic payment transaction records. In particular, the server system is configured to apply the phone-to-city model over first electronic payment transaction records in which city name fields are populated with phone numbers of merchants associated with the first electronic payment transaction records. The phone-to-city model is configured to predict city names with prediction scores against the first electronic payment transaction records. The server system is configured to update the city name fields of the first electronic payment transaction records with the predicted city names having prediction scores greater than a threshold value.

The server system is configured to apply the payment aggregator model over second electronic payment transaction records in which at least one merchant data field of each second electronic payment transaction records is populated with ambiguous data by payment aggregators. The payment aggregator model includes Long Short Term Memory (LSTM) neural network with character level encoding. The server system is configured to update the at least merchant data field of each second payment transaction records based on the application of the payment aggregator model over the second electronic payment transaction records. In similar manner, the server system is configured to apply the merchant name normalization model over third electronic payment transaction records to determine aggregated merchant names. The merchant name fields of the third electronic payment transaction records are populated with ambiguous merchant names. The merchant name normalization model is based on transformer neural network model with character level encoding. The server system is configured to update the merchant name fields of the third electronic payment transaction records based on the application of the merchant name normalization model over the third electronic payment transaction records.

Without in any way limiting the scope, interpretation, or application of the claims appearing below, technical effects of one or more of the example embodiments disclosed herein is to identify ambiguous data in merchant data fields of electronic payment transaction records automatically. Further, the present disclosure allows servers to automatically identify noisy instances in electronic payment transaction records, thereby eliminating inaccurate entries in memory and improving data accuracy and payment processing speed. Thus, the present disclosure is directed towards identifying and isolating noisy payment transaction records from payment transactions automatically, thereby reducing computational complexity in aggregation process of the transaction records and minimizing improper computer processing.

The present disclosure allows improved matching of transactions associated with a particular merchant. In some embodiments, this improvement can result in enhanced tracking of transactions, particularly fraudulent transactions and fraud patterns. For example, fraud trends may not be as readily detectable without consistency in transaction data associated with a particular merchant.

Various example embodiments of the present disclosure are described hereinafter with reference to FIGS. 1 to 9.

FIG. 1 illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, for cleansing merchant information such as, merchant name, location etc. from transaction data, etc. In particular, the present disclosure describes a system to rectify transaction data during merchant aggregation. The environment 100 generally includes a plurality of entities, for example, an acquirer server 102, a payment network 104 including a payment server 106, each coupled to, and in communication with (and/or with access to) a network 110. The network 110 may include, without limitation, a light fidelity (Li-Fi) network, a local area network (LAN), a wide area network (WAN), a metropolitan area network (MAN), a satellite network, the Internet, a fiber-optic network, a coaxial cable network, an infrared (IR) network, a radio frequency (RF) network, a virtual network, and/or another suitable public and/or private network capable of supporting communication among the entities illustrated in FIG. 1, or any combination thereof.

Various entities in the environment 100 may connect to the network 110 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof. For example, the network 110 may include multiple different networks, such as a private network made accessible by the payment network 104 to the acquirer server 102 and the payment server 106, separately, and a public network (e.g., the Internet, etc.).

The environment 100 also includes a server system 108 configured to perform one or more of the operations described herein. In one example, the server system 108 is the payment server 106 associated with the payment network 104. In general, the server system 108 is configured to identify electronic payment transaction records that have ambiguous merchant data fields (e.g., merchant location, merchant name, etc.). Further, the server system 108 is configured to apply aggregation rules to transactions or assigned locations to aggregated merchant IDs. The server system 108 is a separate part of the environment 100, and may operate apart from (but still in communication with, for example, via the network 110) the acquirer server 102, the payment server 106, and any third party external servers (to access data to perform the various operations described herein). However, in other embodiments, the server system 108 may be incorporated, in whole or in part, into one or more parts of the environment 100, for example, the payment server 106. In addition, the server system 108 should be understood to be embodied in at least one computing device in communication with the network 110, which may be specifically configured, via executable instructions, to perform as described herein, and/or embodied in at least one non-transitory computer readable media.

In one embodiment, the acquirer server 102 is associated with a financial institution (e.g., a bank) that processes financial transactions. This can be an institution that facilitates the processing of payment transactions for physical stores, merchants, or an institution that owns platforms that make online purchases or purchases made via software applications possible (e.g., shopping cart platform providers and in-app payment processing providers). The terms "acquirer", "acquirer bank", "acquiring bank" or "acquirer server" will be used interchangeably herein.

In one embodiment, a plurality of merchants 112a, 112b, and 112c is associated with the acquirer server 102. The plurality of merchants 112a-112c may be physical stores such as retail establishments or a merchant facilitated e-commerce website interface (online store). The plurality of merchants 112a, 112b, and 112c is hereinafter collectively represented as "the merchant 112".

To accept payment transactions from customers, the merchant 112 normally establishes an account with a financial institution (i.e., "acquirer server 102") that is part of the financial payment system. Account details of the merchant accounts established with the acquirer bank are stored in merchant profiles of the merchants in a memory of the acquirer server 102 or on a cloud server associated with the acquirer server 102. It shall be noted that all the merchants 112a-112c may not be associated with a single acquirer and the merchants may establish financial accounts with different acquirers and thereby payment transactions may be facilitated by more than one acquirer server and have not been explained herein for the sake of brevity.

In one embodiment, the merchant 112 has a payment transaction terminal (not shown in figures) that communicates directly or indirectly with the acquirer server 102. Examples of the payment transaction terminal may include, but are not limited to, a Point-of-Sale (POS) terminal, and a customer device with a payment gateway application. The POS terminal is usually located at stores or facilities of the merchant 112. The merchant 112 can have more than one payment transaction terminal. In one embodiment, a customer may perform a payment transaction using the customer device (i.e., the mobile phone) which conforms to an e-commerce payment transaction.

In one example, a customer purchases goods or services from the merchant 112 using a payment card. The customer may utilize the payment card to effectuate payment by presenting/swiping the payment card to the POS terminal. Upon presentation of the physical or virtual payment card, account details (i.e., account number) are accessed by the POS terminal. The POS terminal sends payment transaction details to the acquirer server 102. The acquirer server 102 sends a payment transaction request to the server system 108 or the payment server 106 for routing the payment transaction to a card issuer associated with the customer. The payment transaction request includes a plurality of data elements. The plurality of data elements may include, but is not limited to, BIN of the card issuer of the payment card, a payment transaction identifier, a payment transaction amount, a payment transaction date/time, a payment transaction terminal identifier, merchant identification data such as, merchant name and location, acquirer identifier etc. In one embodiment, the payment transaction request may be an electronic message that is sent via the server system 108 or the payment server 106 to the card issuer of the payment card to request authorization for a payment transaction. The payment transaction request may comply with a message type defined by an International Organization for Standardization (ISO) 8583 standard, which is a standard for systems that exchange electronic transaction information associated with payments made by users using the payment card, or the payment account.

In one example, an ISO 8583 transaction message may include one or more data elements that store data usable by the server system 108 to communicate information such as transaction requests, responses to transaction requests, inquiries, indications of fraud, security information, or the like. For example, the ISO 8583 message may include a PAN in the second data field (also known as DE2), an amount of a transaction in DE4, a date of settlement in DE15, a location of merchant 112 in DE41, DE42, and/or DE43, or the like. In particular, the acquirer server 102 transmits merchant name, location, city, and country-code in the DE 43 data element.

The card issuer approves or denies an authorization request, and then routes, via the payment network 104, an authorization response back to the acquirer server 102. The acquirer server 102 sends the approval to the POS terminal of the merchant 112. Thereafter, seconds later, the customer completes the purchase and receives a receipt.

In one embodiment, the server system 108 accesses electronic payment transaction records stored in a transaction database 114 for reporting and data analysis. In one embodiment, the transaction database 114 is a central repository of data that is created by storing electronic payment transaction records from payment transaction requests occurring within acquirers and issuers associated with the payment network 104. The transaction database 114 stores real-time electronic payment transaction records of a plurality of merchants. The electronic payment transaction records may include, but not limited to, payment transaction attributes, such as, merchant data fields such as merchant name, merchant identifier, merchant location, merchant category code (MCC), transaction amount, source of funds such as bank or credit cards, transaction channel used for loading funds such as POS terminal, payment transaction location information, external data sources, and other internal data to evaluate/analyze each payment transaction. In one embodiment, the server system 108 stores, reviews, and/or analyzes information used in merchant aggregation.

The transaction database 114 may be organized by transaction identifier and each transaction identifier may have a separate row composed of data associated with the transaction identifier.

In one embodiment, the server system 108 can maintain a data warehouse (e.g., clean merchant database 116) which stores and augments transaction data, for use in marketing, macroeconomic reporting, etc. For this purpose, a plurality of electronic transaction records is aggregated for reporting and analysis according to merchant data fields (such as, location of the merchant 112, merchant category codes (MCCs), merchant name, etc.). While storing the electronic payment transaction records, the server system 108 extracts merchant data fields (e.g., merchant location) from payment transaction data. Thereafter, the server system 108 is configured to perform merchant location assignment process. In many cases, the merchant data fields extracted from the electronic payment transaction records are ambiguous or noisy in nature and do not have a high probabilistic match with candidate merchant records stored in a clean merchant database 116. In one example, a plurality of electronic payment transaction records is shown in the below table 1.

TABLE 1

| original_merchant_dba_name | original_city_name | original_merchant_postal_code |
|---|---|---|
| HERREMA'S MARKETPLA | ROCHESTER | 14617 |
| P180214 | BRONX | 104690000 |
| Spotify USA | 646-8375380 | 10011 |
| RUUM 5108 | WEST NYACK | 10994 |
| A0005111 | BRONX | 10463 |
| HEATHER BARFIELD MIN | 13478863109 | 11413 |
| FRESH FRUIT AND CAFE O | ASTORIA | 11106 |
| Spotify USA | 646-8375380 | 10011 |
| CHRISTOPHER SMITH | HAMBURG | 14219 |
| NADEAU FURNITURE NYC | NEW YORK | 10003 |

Each row includes various merchant data fields extracted from a transaction record. In the table 1, each column depicts a particular merchant data field such as, DBA name text field designating doing business as (DBA) name of each respective merchant location, a city name text field, merchant postal code numeric field. As shown in table 1, most of the merchant data fields of the plurality of transaction records have ambiguous merchant data fields. For example, in the third row, the city name is populated with the merchant phone number.

Further, sometimes, the merchant data fields are ambiguous to identify the merchant, transaction location, or whether the merchant is affiliated with a chain, brand, or like, where it may be beneficial to consider the merchant as part of an aggregated merchant group.

The server system 108 is configured to perform merchant data cleansing for merchant data aggregation. The server system 108 is configured to match merchant data fields of each of the electronic payment transaction records with candidate merchant transaction records in the clean merchant database 116. In one embodiment, the server system 108 is configured to identify payment transaction records with ambiguous merchant data fields in a fully automated manner using machine learning models and update the payment transaction records with unambiguous merchant data fields corresponding to the ambiguous merchant data fields based one or more data models.

The clean merchant database 116 stores merchant entries that unambiguously identify attributes of a merchant, such as, merchant name, merchant location. In other words, the clean merchant database 116 houses candidate merchant records of merchant 112 that include merchant data fields as registered with the acquirer 102. The merchant data fields may be stored in a tabular data structure, in a text file, or by another storage means as would be understood by one of ordinary skill in the art. More specifically, these unambiguous entries are referred to as 'clean merchant data'.

In one embodiment, the payment network 104 may be used by the payment cards issuing authorities as a payment interchange network. The payment network 104 may include a plurality of payment servers such as, the payment server 106. Examples of payment interchange network include, but are not limited to, Mastercard® payment system interchange network. The Mastercard® payment system interchange network is a proprietary communications standard promulgated by Mastercard International Incorporated® for the exchange of financial transactions among a plurality of financial activities that are members of Mastercard International Incorporated®. (Mastercard is a registered trademark of Mastercard International Incorporated located in Purchase, N.Y.).

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100.

Figure 2:
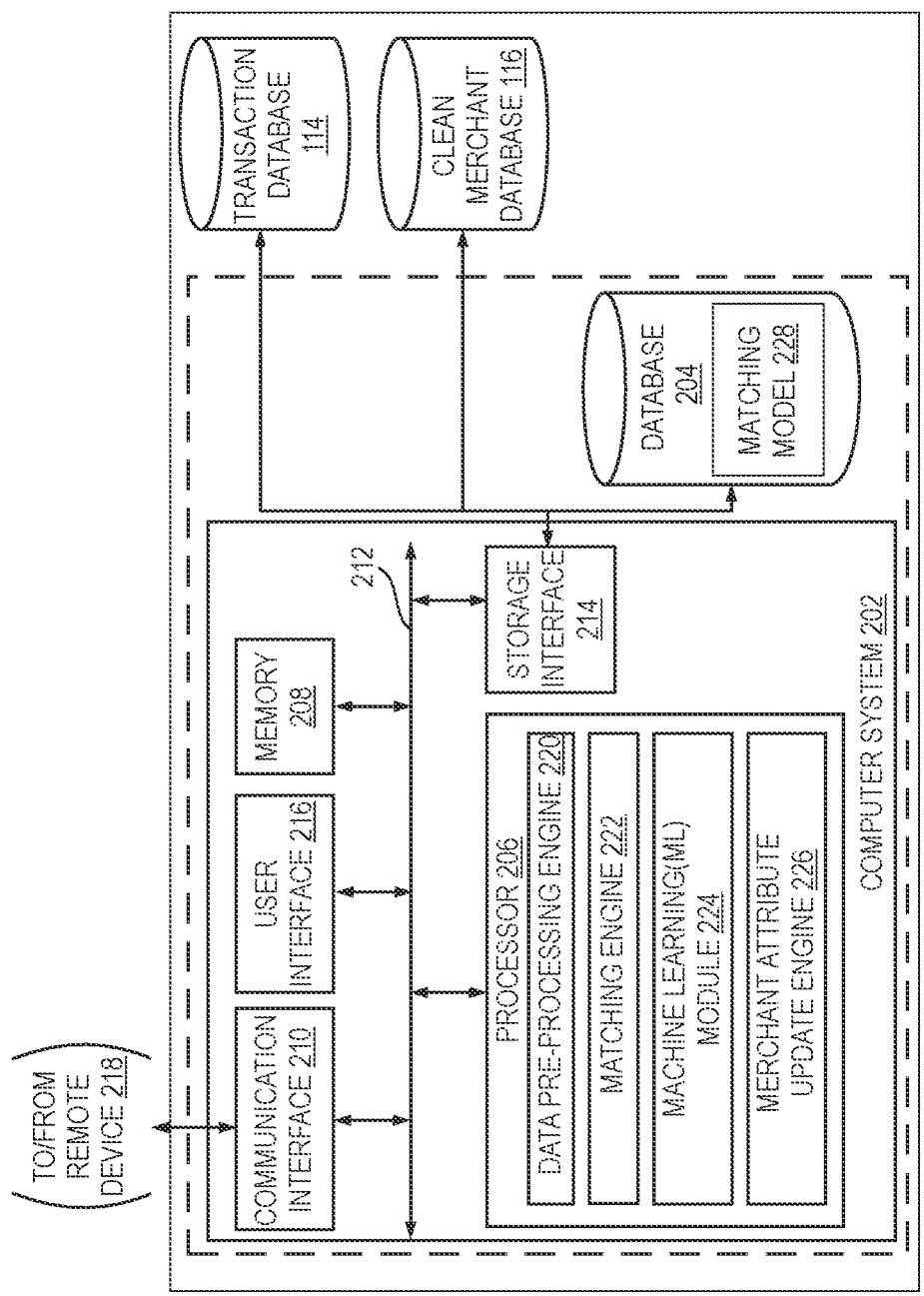
FIG. 2 is a simplified block diagram of a server system, in accordance with an embodiment of the present disclosure.

Referring now to FIG. 2, a simplified block diagram of a server system 200 is shown, in accordance with an embodiment of the present disclosure. The server system 200 is similar to the server system 108. In some embodiments, the server system 200 is embodied as a cloud-based and/or SaaS-based (software as a service) architecture. In one embodiment, the server system 200 is a part of the payment network 104 or integrated within the payment server 106. In another embodiment, the server system 200 is the acquirer server 102. The server system 200 includes a computer system 202 and a database 204. The computer system 202 includes at least one processor 206 for executing instructions, a memory 208, a communication interface 210, and a storage interface 214 that communicate with each other via a bus 212.

In some embodiments, the database 204 is integrated within the computer system 202. For example, the computer system 202 may include one or more hard disk drives as the database 204. A storage interface 214 is any component capable of providing the processor 206 with access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204. In some example embodiments, the database 204 is configured to store a matching model 228. Further, the database 204 is configured to store one or more data models (not shown in figures) for updating ambiguous merchant data fields of payment transaction records. The one or more data models may include, but are not limited to, the merchant name normalization model, phone-to-city model, payment aggregator model, etc.

Examples of the processor 206 include, but are not limited to, an application-specific integrated circuit (ASIC) processor, a reduced instruction set computing (RISC) processor, a complex instruction set computing (CISC) processor, a field-programmable gate array (FPGA), and the like. The memory 208 includes suitable logic, circuitry, and/or interfaces to store a set of computer-readable instructions for performing operations. Examples of the memory 208 include a random-access memory (RAM), a read-only memory (ROM), a removable storage drive, a hard disk drive (HDD), and the like. It will be apparent to a person skilled in the art that the scope of the disclosure is not limited to realizing the memory 208 in the server system 200, as described herein. In another embodiment, the memory 208 may be realized in the form of a database server or cloud storage working in conjunction with the server system 200, without departing from the scope of the present disclosure.

The processor 206 is operatively coupled to the communication interface 210 such that the processor 206 is capable of communicating with a remote device 218 such as, the acquirer server 102, the payment server 106, or communicating with any entity connected to the network 110 (as shown in FIG. 1).

It is noted that the server system 200 as illustrated and hereinafter described is merely illustrative of an apparatus that could benefit from embodiments of the present disclosure and, therefore, should not be taken to limit the scope of the present disclosure. It is noted that the server system 200 may include fewer or more components than those depicted in FIG. 2.

In one embodiment, the processor 206 includes a data pre-processing engine 220, a matching engine 222, machine learning (ML) module 224, and merchant attribute update engine 226. It should be noted that components, described herein, can be configured in a variety of ways, including electronic circuitries, digital arithmetic and logic blocks, and memory systems in combination with software, firmware, and embedded technologies.

The data pre-processing engine 220 includes suitable logic and/or interfaces for accessing a plurality of electronic payment transaction records from the transaction database 114. Each electronic payment transaction record includes, but is not limited to, merchant data fields, payment transaction amount, payee identifier, transaction time/identifier, etc. In one embodiment, the merchant data fields may include, but are not limited to, merchant name, acquirer merchant identifier, merchant address (e.g., city and Postal code), merchant state/country code, merchant category code (MCC), etc. Moreover, the merchant data fields include continuous/numerical data and categorical data. Examples of continuous data include, but are not limited to, acquirer merchant identifier, merchant address, merchant zip code, contact number, merchant taxpayer identifier, and the like. Examples of categorical data include, but are not limited to, merchant city, merchant state code, merchant country, a merchant business category, and the like. It shall be noted that the merchant data fields used herein are for example purposes only and embodiments of the present disclosure can be practiced on fewer or more merchant data fields than those described herein.

Thereafter, the data pre-processing engine 220 is configured to extract the merchant data fields from each electronic payment transaction record. The processor 206 is configured to parse transaction strings (i.e., electronic payment transaction records) for extracting the merchant data fields. In one example, to parse the electronic payment transaction record, merchant data fields, transaction amount, transaction identifier, etc. in the electronic payment transaction record are separated using a defined set of delimiters (e.g., spaces, equal signs, colons, semicolons, etc.). The merchant data fields may include, but are not limited to, merchant name field, address field, merchant category code (MCC) field, and merchant identifier field. In one embodiment, the processor 206 is configured to filter the merchant data fields to remove noise/junk characters including numbers, special characters, lowercase, punctuations, etc. that may have been introduced during storage and transmission. These noises and/or junk characters carry no significant information and are usually filtered out.

The data pre-processing engine 220 is configured to perform the scrubbing process over the merchant data fields to obtain standardized merchant data fields. This happens as payment transaction data format adopted by every acquirer is different and the electronic payment transaction records coming from different acquirers may not conform to one standard format that may introduce glitches while processing the merchant data fields. In particular, the data pre-processing engine 220 is configured to remove these issues using a predefined rule set (e.g., Regex rules) which cleans all incoming transaction strings and puts them into a format described for matching. More specifically, the scrubbing process is employed by the processor 206 for merchant location data standardization and/or normalization. In one embodiment, the scrubbing process may include address normalization techniques for merchant location fields.

For example, the scrubbing process may be performed on merchant name data to ensure that all transaction records associated with a particular merchant have a common merchant name assigned to it. A similar process may be performed on merchant location data. For example, merchant location data may be conformed to match the standards recognized by a government agency (e.g., the U.S. Postal Service). In some embodiments, the scrubbing process may also be performed to correct any inconsistencies in merchant name or merchant location data. For example, transaction data may include the merchant location data: "San Jose, Calif. 94111." However, the zip code "94111" is tagged to San Francisco, Calif. In such a situation, the scrubbing process may determine that the merchant location data should be "San Francisco, Calif. 94111." The scrubbing process may be performed based on a series of predefined ruleset.

However, it shall be noted that data pre-processing is optional and embodiments of the present disclosure can be practiced on the merchant data fields as received in the electronic payment transaction records.

The matching engine 222 includes suitable logic and/or interfaces for matching the electronic payment transaction records to at least one candidate merchant record in the clean merchant database 116 based on a matching model 228. In one embodiment, the matching model 228 is an adaptive blocking algorithm for matching data elements of the clean merchant database 116 with associated merchant data fields of the electronic payment transaction records. In a non-limiting example, some electronic payment transaction records may be matched with candidate merchant records in a clean merchant database. In one embodiment, the clean merchant database 116 is created from historical merchant transaction data and externally sourced merchant database (such as, Pitney Bowes database for merchant locations).

Initially, the matching engine 222 is configured to directly match the incoming pre-processed payment transaction records with the clean merchant database 116 without any machine learning model since some records may have exact matches with the clean merchant database 116 where the acquirers have entered all the details correctly.

The processor 206 is configured to generate an optimal blocking function that selects candidate merchant records based on a set of predicates. Examples of predicates for constructing blocking function include, but are not limited to, exact match, a common token, a common integer, same integers, differ by one integer, same 'n' first characters. In an embodiment, a query string is generated based on the merchant data fields in a payment transaction record. The blocking function matches the query string with candidate merchant records stored in the clean merchant database 116.

In one example, it is assumed that the processor 206 determines two entries in the merchant database 116 that are similar to the query string. A candidate merchant record differs from the merchant data fields, namely, merchant name by one token, merchant address by two integers and three tokens, and merchant acquirer identifier by 2 integers. However, the merchant data fields and another candidate merchant record have an exact match in merchant city, merchant state code, and merchant country.

In one embodiment, a set of matching features (i.e., {F=f1, f2, f3, . . . fn}) is generated based on the matching of the query string with the candidate merchant record. Based on these matching features, a semi-supervised model (or a probabilistic matching model) is trained to obtain matching probability scores corresponding to the matching of payment transaction records.

After finding transaction records of the exact match with the clean merchant database 116, the processor 206 is configured to normalize address fields of remaining non-matched payment transaction records based on some normalization rules. Since a lot of times, all the other merchant data fields except the address field match with candidate merchant records of clean merchant database 116, therefore, address normalization is performed over the remaining non-matched payment transaction records and clean merchant records of the clean merchant database 116.

Thereafter, the matching engine 222 attempts to match the address normalized transaction strings with the address normalized candidate merchant records of the clean merchant database 116. Because of the address normalization, some of the payment transaction records are matched with entries of clean merchant database 116.

The ML module 224 includes suitable logic and/or interfaces for training a probabilistic matching model for computing matching probability scores of electronic payment transaction records after the match. The probabilistic matching model is a regularized logistic regression model that is trained in a semi-supervised fashion. The regularized logistic regression is performed using the results of matching, in order to calculate a probability that the merchant data fields of a payment transaction record match with at least one candidate merchant record of the clean merchant database 116. The ML module 224 takes the matching pairs (merchant data fields of a transaction record and merchant attributes of candidate merchant records) and extracts the set of matching features corresponding to the matching pairs. The objective of the probabilistic matching model is to learn what kind of behaviors make a transaction record an exact match or false match. Thus, the ML module 224 filters out payment transaction records that have not matched with at least one clean merchant records. The probabilistic matching model is trained in a semi-supervised approach where about 50-100 possible matches are presented to the user (based on marginal sampling) who labels them based on his/her experience. Using the information obtained from these small numbers of labels, a regularized logistic regression model is trained which is then used to get a matching probability score for each of the pairs of transaction records.

More specifically, the processor 206 is configured to obtain the merchant probability score for an electronic payment transaction record based on a matching of the merchant data fields of the electronic payment transaction record to corresponding merchant attributes of at least one candidate merchant record. The following table 2 depict matching probability scores (see, first column) corresponding to various electronic payment transaction records:

TABLE 2

| Score | Cleansed_ merchant | cleansed_ city | cleansed_ postal | original_ merchant | original_ city | Original_ _postal |
|---|---|---|---|---|---|---|
| 0.65816426 | HERREMA'S BELLS FOOD MARKET | ROCHESTER | 14617-1409 | HERREMA'S MARKETPtA | ROCHESTER | 14617 |
| 0.35560477 | ATM 2018 WILLIAMSBRIDGER | BRONX | 10461-6201 | P180214 | BRONX | 104690000 |
| 0.91112828 | SPOTIFY USA | NEW YORK | 10011-4655 | Spotify USA | 646-8375380 | 10011 |
| 0.95918667 | RUUM 5108 | WCST NYACK | 10994-6612 | RUUM 5108 | WEST NYACK | 10994 |
| 0.47784784 | ATM 5825-35 BROADWAY | BRONX | 10463-5217 | A0005111 | BRONX | 10463 |

TABLE 2-continued

| Score | Cleansed_merchant | cleansed_city | cleansed_postal | original_merchant | original_city | Original_postal |
|---|---|---|---|---|---|---|
| 0.90995765 | HEATHER BARFIELD MINISTRIES, INC. | SPRINGFIELD GARDENS | 11413-1027 | HEATHER BARFIELD MIN | 13478863109 | 11413 |
| 0.86057281 | FRESH FRUITS & VEGETABLES | ASTORIA | 11106-1851 | FRESH FRUIT AND CAFE O | ASTORIA | 11106 |
| 0.91112828 | SPOTIFY USA | NEW YORK | 10011-4655 | Spotify USA | 646-8375380 | 10011 |
| 0.5535451 | CHRISTOPHER SMITH | BUFFALO | 14204-2752 | CHRISTOPHER SMITH | HAMBURG | 14219 |
| 0.87059695 | NADEAU FURNITURE | NEW YORK | 10003-4662 | NADEAU FURNITURE NYC | NEW YORK | 10003 |

In one embodiment, the processor 206 is configured to take out noisy data instances from the matching pairs that have matching probability scores less than a threshold value. In other words, the processor 206 is configured to identify a set of electronic payment transaction records from the plurality of transaction records where each payment transaction record of the set of electronic payment transaction records has a matching probability score less than the threshold value. The set of electronic payment transaction records is taken out for further analysis. Thereafter, the processor 206 is configured to find out at least one issue for non-matching for each payment transaction record of the set of electronic payment transaction records. In some embodiments, at least one issue may be field switching, payment aggregators sending incorrect addresses, phone numbers populated in city name field, incorrect merchant name, etc.

The merchant attribute update engine 226 includes suitable logic and/or interfaces for updating the set of electronic payment transaction records by modifying the ambiguous merchant data fields to unambiguous merchant data fields based on one or more data models. The one or more data models may include, but are not limited to, the phone-to-city model, payment aggregator model, and merchant name normalization model.

In one embodiment, the phone-to-city model is applied over a first electronic payment transaction record in which the city name field is populated with one or more phone numbers of a merchant associated with the first electronic payment transaction record or alphanumeric strings. This phone-to-city model tries to correct the transaction records by using an external merchant dataset for finding out the probable city names. The payment transaction records with this problem are modified and again preprocessed into a correct format for matching. A detailed explanation of the phone-to-city model is provided with reference to the FIG. 5A.

The payment aggregator model is applied over a second payment transaction record in which at least one merchant data field is populated with ambiguous data (such as, merchant name field having asterisk '*' signs with payment aggregator name) by a payment aggregator. The payment aggregator model takes care of the issues arising from the payment aggregators sending in incorrect data in the merchant name. The payment aggregator names may contain a lot of noise and junk characters/numbers. Once the payment aggregator model has been applied over the second payment transaction record, the transaction records are preprocessed for the matching model.

In one embodiment, the payment aggregator model includes Long Short Term Memory (LSTM) neural network with character level encodings. The payment aggregator model is trained based on a pre-cleaned list of merchant names used to label the data and some past unclean strings provided by the users. Initially, all the asterisk signs in the data string are removed. At the input side, the payment aggregator model performs character level encoding of a data string (e.g., cleansed and uncleansed merchant names) and represents each character into three-dimensional representations. These three-dimensional representations are provided to the first LSTM layer at each time step. Further, the multiple LSTM layers are utilized for learning hidden representations corresponding to cleansed and uncleansed merchant names. The payment aggregator model is configured to utilize attention layer for defining weights corresponding to earlier characters for predicting the next characters.

Thereafter, the payment aggregator model uses a softmax layer to create binary classification problem. The softmax layer provides the output as class '1' if the second part (i.e., after the asterisk '*' sign) of the data string (i.e., sub-merchant name) has some junk information. In another scenario, the softmax layer provides the output as class '0' if the second part of the data string has some relevant merchant name.

TABLE 3

| | clean_name | unclean_name | class |
|---|---|---|---|
| 0 | PAYPAL | PAYPAL *25MAY | 1 |
| 1 | PAYPAL | PAYPAL *MAY3312 | 1 |
| 2 | PAYPAL | PAYPAL *MARC9584 | 1 |
| 3 | PAYPAL | PAYPAL *OX7 | 1 |
| 4 | PAYPAL | PAYPAL *1 1 JOLIE | 1 |
| 5 | PAYPAL | PAYPAL *10 8 VIDEO 10 | 1 |
| 6 | PAYPAL | PAYPAL * 104214A:Mamas | 1 |

TABLE 4

| | clean_name | unclean_name | class |
|---|---|---|---|
| 0 | GRANTLLRED | PAYPAL *GRANTLLRED | 0 |
| 1 | GRANTANDHEA | PAYPAL *GRANTANDHEA | 0 |
| 2 | GRANTANDJEN | PAYPAL *GRANTANDJEN | 0 |
| 3 | GRANTBERGMA | PAYPAL *GRANTBERGMA | 0 |

As shown in table 3, the first row refers to a transaction record that includes an unclean merchant name field (e.g., PAYPAL*25MAY). Here, since the second part (e.g., 25

MAY) of the data string does not have any merchant name information, therefore, the payment aggregator model provides a probability value for the transaction record indicating class '1'. Therefore, the processor 206 is configured to consider the first part (e.g., PAYPAL) of the data string as the clean merchant name. In the table 4, the first row refers to a transaction record that includes an unclean merchant name field (e.g., PAYPAL*GRANTALLRED). Here, since the second part (e.g., GRANTALLRED) of the data string is already included in the existing clean merchant name list, therefore, the payment aggregator model provides a probability value for the transaction record indicating the class '0'. Thus, the processor 206 is configured to consider the second part of the data string as the clean merchant name for the transaction record.

Further, the merchant name normalization model is applied over a third electronic payment transaction record in which the merchant name field is populated with ambiguous data. The merchant name normalization model is configured to determine an aggregate merchant name associated with the third electronic payment transaction record. The merchant name normalization model is based on a transformer-based neural network model with character-level encoding.

In one example scenario, a payment transaction record from the set of electronic payment transaction records has a phone number (e.g., 6574454005) in the city name field and merchant name (e.g., PAYPAL*UBER In). In this scenario, the processor 206 is configured to apply the phone-to-city model as well as a payment aggregator model for correcting the merchant name and city name.

After updating the merchant data fields of remaining non-matched payment transaction records by the one or more data models, the processor 206 is configured to perform matching over the updated payment transaction records and identify payment transaction records having matching probability scores less than the predetermined threshold value.

In one embodiment, the payment transaction records with medium matching probability scores are sent to a human annotator who checks if these payment transaction records can match with existing merchant attributes (i.e., locations) of various clean merchant records stored in the clean merchant database 116 or not.

Further, the payment transaction records with low matching probability scores are assigned to new merchant locations by the human annotator and are then tagged with a new merchant identifier. The new merchant locations are then added to the clean list of locations in the clean merchant database 116 after basic record cleansing.

Figure 3A:
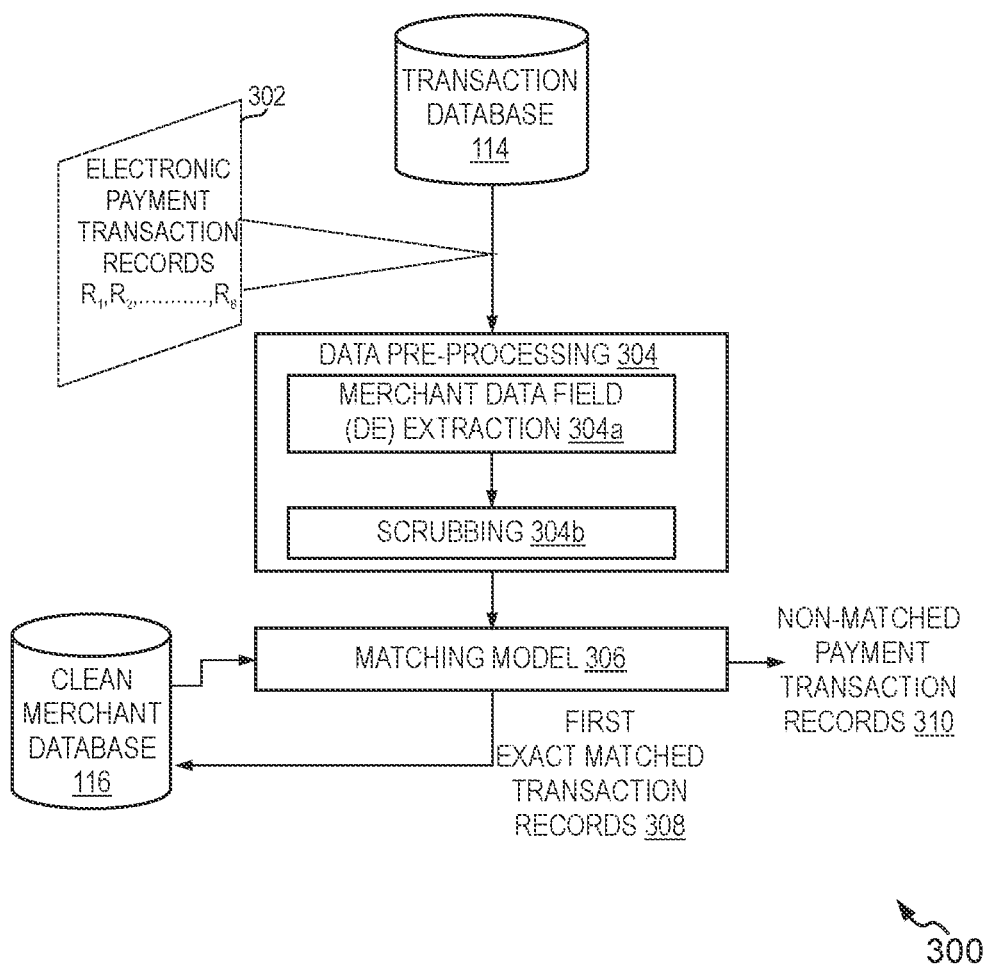
FIGS. 3A and 3B, collectively, represent a schematic block diagram representation of a process flow for merchant data cleansing in a payment network, in accordance with an embodiment of the present disclosure.
Figure 3B:
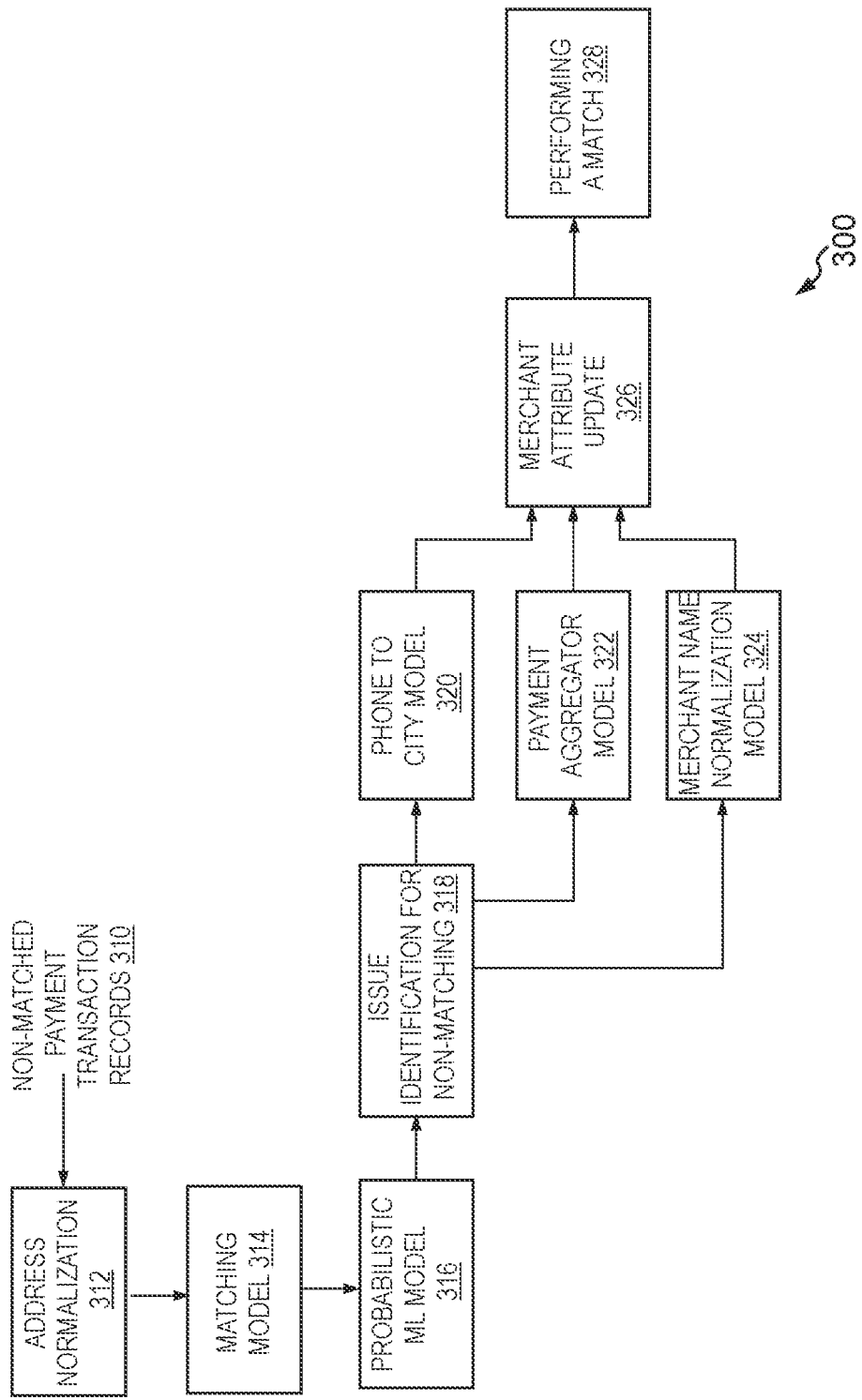

FIGS. 3A and 3B, collectively, represent a schematic block diagram representation 300 of a process flow for merchant data cleansing for payment transactions in a payment network, in accordance with an embodiment of the present disclosure.

At first, the processor 206 is configured to access electronic payment transaction records R1, R2 . . . Rn (see, 302) from the transaction database 114 and perform data pre-processing (see, 304) over the electronic payment transaction records. The data pre-processing includes two steps such as merchant data field (DE) extraction 304a and scrubbing 304b. The electronic payment transaction records may include transaction data for a financial transaction (e.g., payment data, transaction total, consumer data). The transaction data may include a date for a specific transaction, including items purchased and item price, authentication data, payment methods, merchant data (e.g., merchant name, merchant location/address), etc. The merchant data is utilized for identifying an aggregate merchant associated with the transaction data. In some embodiments, the merchant data for a merchant may also be used to correlate related transactions associated with the merchant. In such embodiments, as the same merchant attributes data may be applied to all transactions from the same merchant, all transactions from the same merchant may be correlated to each other.

The processor 206 is configured to extract (see, 304a) merchant data fields from each electronic payment transaction record. The processor 206 is configured to parse transaction strings (i.e., electronic payment transaction records) for extracting the merchant data fields. The merchant data fields may include, but are not limited to, merchant name field, address field, merchant category code (MCC) field, and merchant identifier field. The processor 206 is configured to extract the merchant data fields, in raw text form, from the electronic payment transaction records and perform scrubbing (see, 304b) over the merchant data fields to remove noise and/or junk characters from the merchant data fields. The merchant data fields of the electronic payment records are not standardized for processing, hence, the processor 206 is configured to scrub the merchant data fields to obtain standardized merchant data fields.

The processor 206 is configured to provide the pre-processed transaction records to a matching model 306 that is configured to match the payment transaction records to at least one candidate merchant record stored in the clean merchant database 116. The processor 206 is configured to determine a set of matching features that are generated based on the matching of payment transaction record with candidate merchant records. Thus, the processor 206 is configured to generate matched pairs and non-matched pairs based on the set of matching features. The first exact matched transaction records 308 (i.e., matched transaction strings) are stored in the clean merchant database 116 after some cleaning process. Some of the transaction records maybe not matched due to ambiguous address fields, therefore, the non-matched payment transaction records 310 are then processed with further processes (such as, address normalization).

The processor 206 is configured to normalize address fields of non-matched payment transaction records 310 (i.e., unmatched transaction strings) based on address normalization (see, 312). The address normalization process may include normalizing or standardizing portions of data into a common form. For example, a data normalization process may be on merchant location data. For example, merchant location data may be conformed to match the standards recognized by a government agency (e.g., the U.S. Postal Service). In one embodiment, the address normalization may include multilingual tokenization, abbreviation expansion, address language classification, numeric expression parsing, transliteration, etc. In similar manner, the processor 206 is also configured to normalize address fields of clean merchant records stored in the clean merchant database.

After the address normalization, the processor 206 is configured to match the address normalized transaction strings with the address normalized candidate merchant records of the clean merchant database 116 (see, 314). Because of the address normalization, some of the payment transaction records are matched with entries of the clean merchant database 116.

Thereafter, the processor 206 is configured to provide all the matching pairs to the ML model 316 (i.e., probabilistic matching model) to obtain matching probability scores corresponding to each matching pair. The matching pair denotes merchant data fields of a payment transaction record and merchant attributes of a candidate merchant record stored in the clean merchant database 116. The processor 206 is configured to calculate a matching probability score for each payment transaction record using the logistic regression model. The matching probability score is determined based on the similarity of the merchant data fields with the merchant attributes of candidate merchant records. This process helps in determining merchant data fields of electronic payment transaction records that do not have an exact match in the clean merchant database. Moreover, a set of matching features is also generated for each electronic payment transaction record including categorical and numerical values of matched merchant data fields.

In one embodiment, the processor 206 is configured to determine a set of electronic payment transaction records with matching probability scores lesser than the predefined threshold (e.g., 0.3). The processor 206 is configured to identify at least one issue for non-matching for each of the set of electronic payment transaction records (see, 318). The matching model does not work well with the set of electronic payment transaction records because of noise in the data due to field switching, payment aggregators sending incorrect addresses, and phone numbers in the city name field.

The processor 206 is configured to divide the set of electronic payment transaction records into first, second, and third electronic payment transaction records based on the identified issues. The processor 206 is configured to apply phone-to-city model 320 over the first electronic payment transaction records in which city name fields are populated with phone numbers of merchants associated with the first electronic payment transaction records. The phone-to-city model 320 is configured to predict city names with prediction scores against the first electronic payment transaction records.

In each second electronic payment transaction record, the merchant name field is populated with payment aggregator names along with some junk strings. The processor 206 is configured to apply a payment aggregator model 322 for finding the correct merchant name.

In each third electronic payment transaction record, the merchant name field is populated with an ambiguous merchant name. The processor 206 is configured to apply merchant name normalization model 324 to determine aggregated merchant names corresponding to the third electronic payment transaction records.

Based on the application of the phone-to-city model, the payment aggregator model, and the merchant name normalization model, the processor 200 is configured to update merchant data fields of the set of electronic payment transaction records (see, merchant attribute update 326). Thereafter, the processor 206 is configured to perform a match (see, 328) the updated set of electronic payment transaction records with candidate merchant records stored in the clean merchant database 116.

Figure 4:
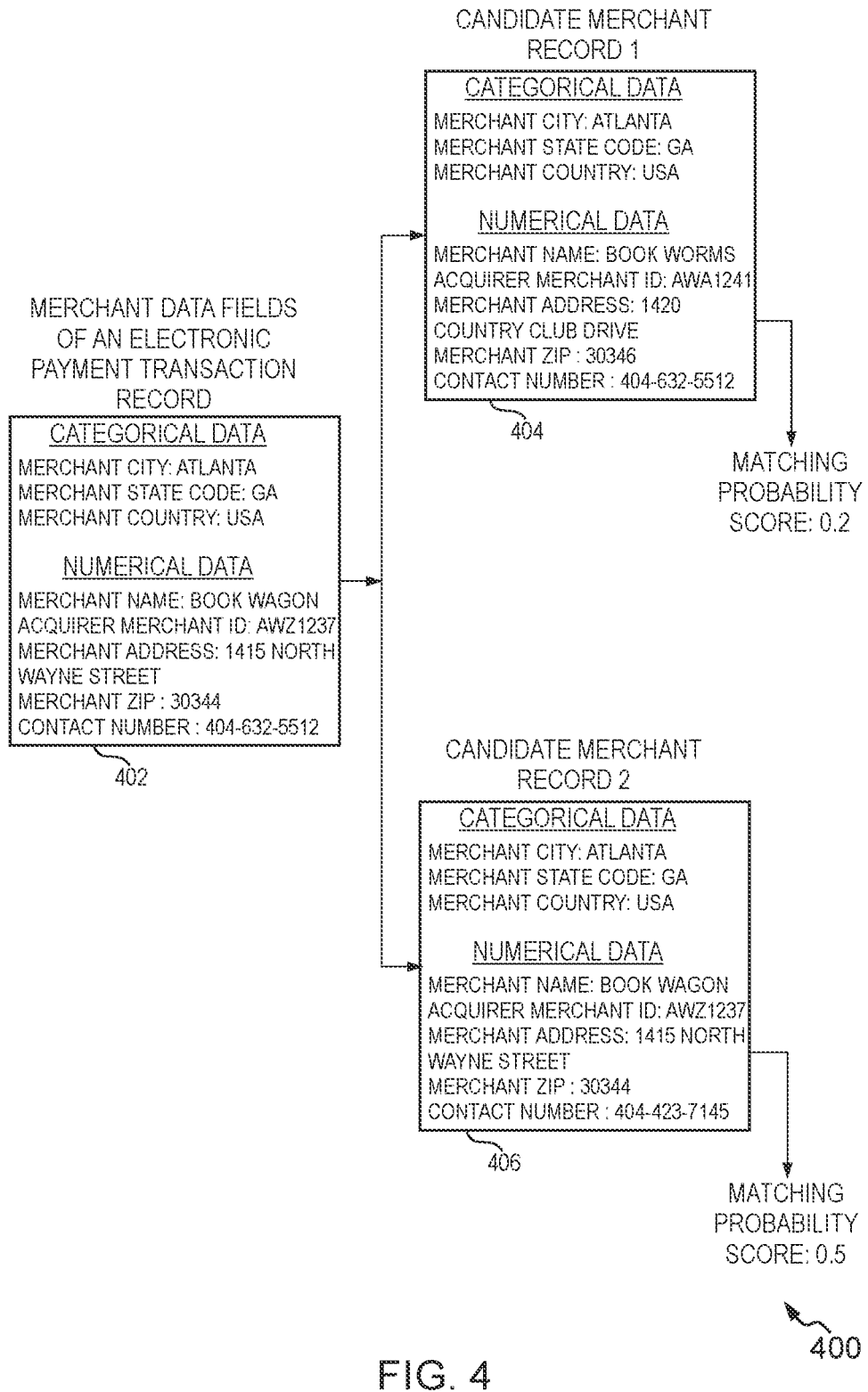
FIG. 4 is an example representation of matching a payment transaction record with candidate merchant records stored at a clean merchant database, in accordance with an example embodiment of the present disclosure.

Referring now to FIG. 4, an example representation 400 of matching a payment transaction record with candidate merchant records stored at the clean merchant database 116, is illustrated, in accordance with an example embodiment of the present disclosure. The payment transaction record includes, but is not limited to, merchant data fields 402. The merchant data fields 402 may include categorical and numerical data representing merchant information such as, merchant name, merchant address, merchant city, merchant state code, merchant zip code, merchant country, contact number, and acquirer merchant identifier (ID).

In one embodiment, the processor 206 is configured to utilize an adaptive blocking algorithm for matching the payment transaction record with corresponding candidate merchant records stored at the clean merchant database 116. The processor 206 is configured to generate an optimal blocking function that selects candidate merchant records based on a set of predicates. Examples of predicates for constructing blocking function include, but are not limited to, exact match, a common token, a common integer, same integers, differ by one integer, and same 'n' first characters.

As shown in the FIG. 4, the payment transaction record R1 includes merchant data fields 402. In an embodiment, a query string is generated based on the merchant data fields 402 in the payment transaction record R1. The blocking function matches the query string with candidate merchant records 404 and 406.

In an example scenario, the processor 206 determines two entries in the merchant database 116 that are similar to the query string. The candidate merchant records 404 and 406 are identified in the clean merchant database 116 that are similar to the query string.

The candidate merchant record 404 differs from the merchant data fields 402, namely, merchant name by one token, merchant address by two integers and three tokens, and merchant acquirer identifier by 2 integers. However, the merchant data fields 402 and candidate merchant record 404 have an exact match in merchant city, merchant state code, and merchant country. In this example, the merchant ("Book Wagon") associated with the payment transaction record R1 has changed a telephone line, for example, acquired a new telephone line that may have earlier belonged to a merchant ("Book Worms") with a similar merchant name and operating in the same city.

The candidate merchant record 406 differs from the merchant data fields 402, namely, merchant contact number by 10 integers. However, merchant data fields 402 of the payment transaction record R1 and the candidate merchant record 406 matches in merchant name, merchant address, merchant city, merchant state code, and merchant country. As explained above, the merchant ("Book Wagon") associated with the payment transaction record R1 may have changed a telephone line and may not have updated it, thereby differing from the candidate merchant record 406 in one field.

In one embodiment, a set of matching features (i.e., $\{F=f1, f2, f3, \ldots, fn\}$) is generated based on the matching of the query string with the candidate merchant record. More specifically, the set of matching features is various string distances based on matching each of the merchant data fields 402 of the payment transaction record R1 to a corresponding attribute in the candidate merchant record. For example, when the merchant names in the merchant data field 402 and candidate merchant record 404 are matched and differ by just one word (i.e., one token), a corresponding string distance is calculated. This string distance forms a matching feature of the set of matching features. In an embodiment, the set of matching features may be either categorical or numerical data. In a non-limiting example, the string distances are determined using string similarity algorithms Examples of the string distances include, but are not limited to, Jaccard similarity, Levenshtein distance, Jaro Winkler distance, etc.

In one embodiment, a matching probability score is determined by the probabilistic matching model between the merchant data fields of the electronic payment transaction record R1 and each of the candidate merchant records 404 and 406 based on the set of matching features generated. More specifically, the matching probability score is determined based on the string distances between each of the merchant data fields and corresponding merchant attributes in a candidate merchant record (e.g., candidate merchant record 406). In an example, the matching probability score determined on matching merchant data fields 402 of the electronic payment transaction record R1 and the candidate merchant record 404 is 0.2. The matching probability score between the merchant data fields 404 of the payment transaction record R1 and the candidate merchant record 404 is less as the set of matching features (or the string distance) indicates that the payment transaction record R1 and 404 differ in most of the fields (e.g., merchant name, merchant address, acquirer merchant ID). Similarly, the matching probability score (i.e., 0.5) is determined based on a matching of merchant data fields 402 and the candidate merchant record 406. Thus, the candidate merchant record 406 is identified as a possible match for the payment transaction record R1.

Figure 5A:
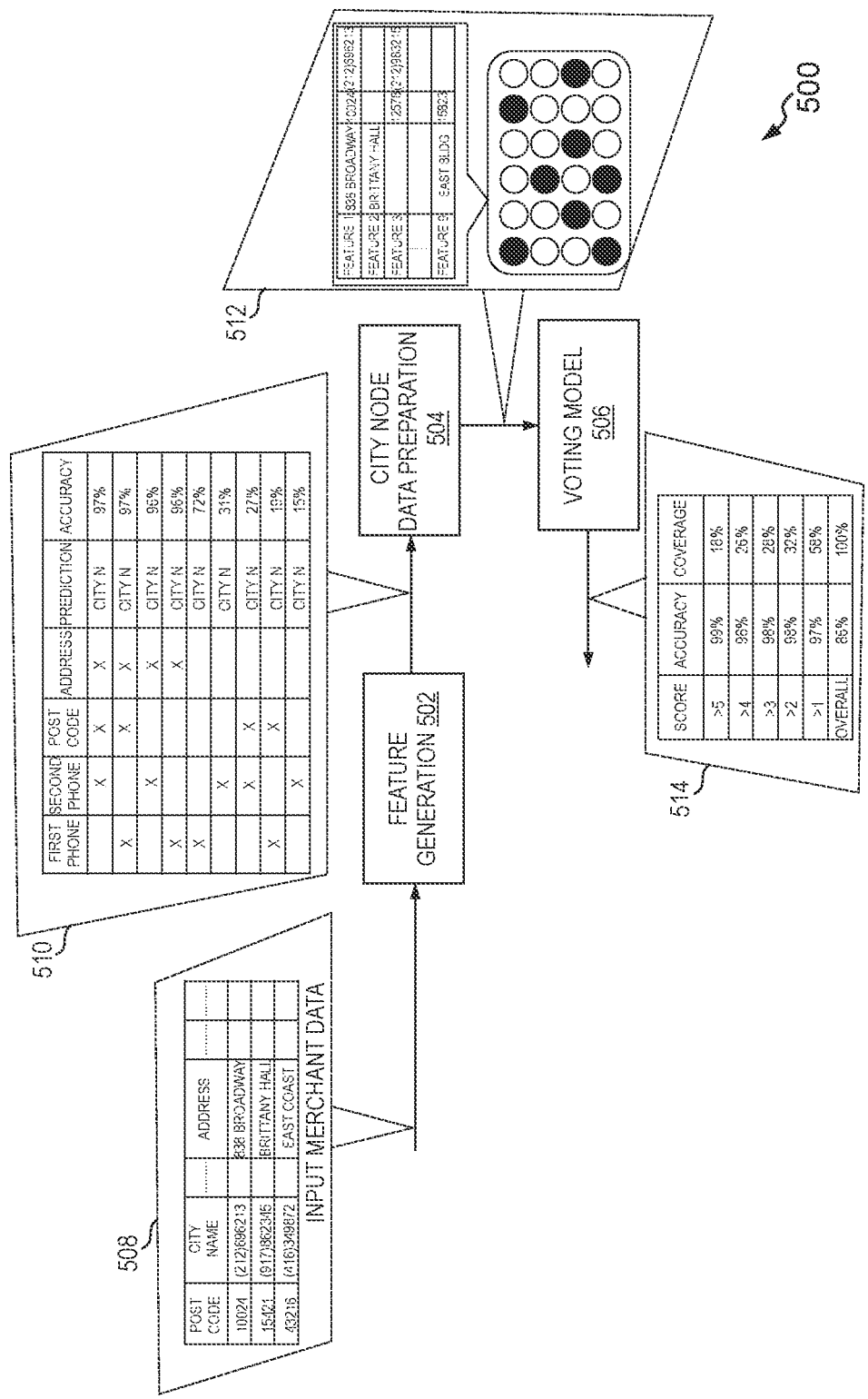
FIG. 5A is an example representation of phone-to-city model for predicting city name corresponding to the phone number that is populated in the city field of an electronic payment transaction record, in accordance with an embodiment of the present disclosure.

Referring now to FIG. 5A, an example representation 500 of phone-to-city model for predicting city name corresponding to a phone number that is populated in the city field of an electronic payment transaction record, in accordance with an embodiment of the present disclosure. As mentioned ground truth data such as, Pitney database. To each city node, a combination of features such as phone, postcode and address are attached as seen in the ground truth data.

When a phone number is encountered in city field in the merchant data 508, the processor 206 is configured to match each feature combination of the merchant data 508 with features attached with city nodes. Based on the match, the processor 206 is configured to extract candidate cities from the node level city data. Different features are generated as a combination of phone, postcode, address so that they can be matched from the source (ground truth data such as Pitney database). Each feature combination has an accuracy score which is calculated as a correctness in predicting city value by matching with cleansed merchant data.

The voting model 506 is configured to be weighted across various features and pick the city predicted with combined confidence score from each of the 9 different feature combinations. Thus, the phone-to-city model is configured to predict a city with a prediction score (that is greater than a threshold value) against each of the transaction record wherever the phone number is present in place of city name field (see, table 514). The following table depicts results of the phone-to-city model provided with various data strings:

TABLE 3

| Postal Code | Merchant Address | Predicted City | Score | Unclean City Name | Cleansed City |
| --- | --- | --- | --- | --- | --- |
| 92831 | 1120 E Valencia Dr | FULLERTON | 5.35 | 6574454005 | FULLERTON |
| 23323-3333 | 713 FENWAY AVE STE A | CHESAPEAKE | 5.19 | 757-5485557 | CHESAPEAKE |
| 1020 | 1183 MEMORIAL DRIVE | CHICOPEE | 5.19 | 413-5935566 | CHICOPEE |
| 92867-5402 | 977 N Main St | ORANGE | 5.19 | 714-633-9894 | ORANGE |
| 76014 | 2350 E MAYFIELD RD | ARLINGTON | 5.19 | 817-855-4910 | ARLINGTON | earlier, the phone-to-city model 500 is utilized for updating the merchant city field by predicting the city name corresponding to the phone number or alphanumeric present in the city field in the transaction string. The phone-to-city model 500 is configured to create ground truth data by setting data at the city level based on third-party merchant databases (such as, Pitney database). Each city has features that are a combination of zip code, postal code, the phone number associated with the city name. In one example, the phone-to-city model utilizes 9 different combinations of the phone, postcode, and address field derived from every address combination seen in the Pitney database to predict a city against each transaction record wherever phone number is present in place of the city name field. The accuracy of the prediction is measured by matching the predicted city name with the cleansed city name.

The phone-to-city model 500 includes three processes: feature generation process 502, city node data preparation 504, and voting model 506. In the feature generation process 502, the processor 206 is configured to take input merchant data 508 and derives different combinations of features such as, first merchant contact, second merchant contact number, merchant postal code and address field, etc. from various merchant data fields of payment transaction records (see, table 510). In one example, 9 different combinations of phone number, postal code, and address field are formed.

In the city node data preparation 504, the processor 206 is configured to generate a city node (see, table 512) from For example, in the first row of merchant address fields of a transaction record, the unclean city name is "6574454005". The processor 206 in the server system 200 may generate different combinations of features using phone number, postal code, and address fields of the transaction record. The processor 206 is configured to predict city name (i.e., FULLERTON) for the transaction record based on the different combination of features by applying the phone-to-city model with a prediction score (5.35).

Figure 5B:
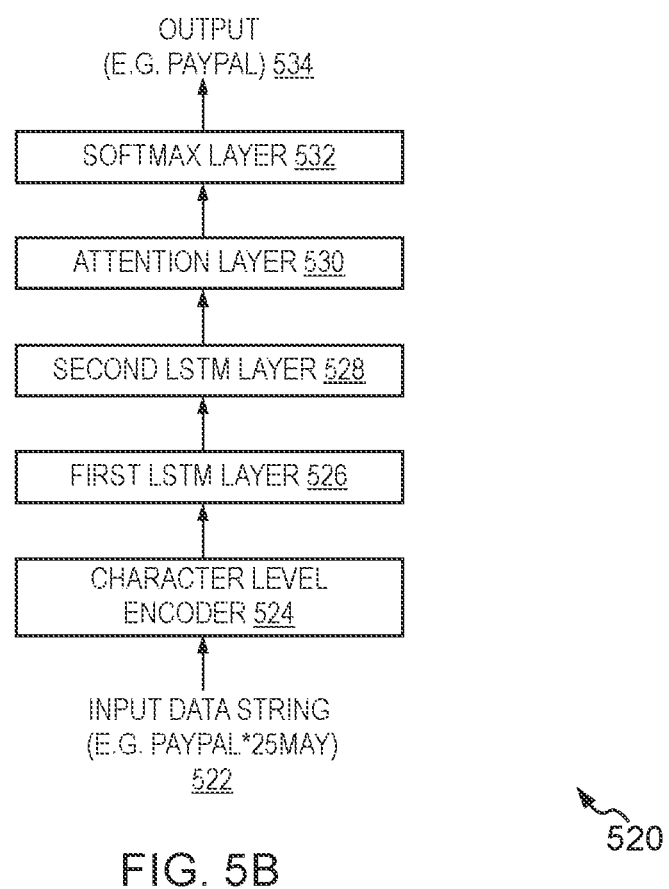
FIG. 5B is an example representation of payment aggregator model, in accordance with an embodiment of the present disclosure.

Referring now to FIG. 5B, an example representation 520 of payment aggregator model, in accordance with an embodiment of the present disclosure. As mentioned earlier, the payment aggregator model is utilized for correcting merchant names having asterisk signs along with payment aggregator names. The payment aggregator model takes care of the issues arising from the payment aggregators sending in incorrect data in the merchant name Since data available for unclean merchant names was very little, sometimes it's a randomly generated string, other times it's decided by the user whether it's a clean merchant name or not. There is no fine line between a clean merchant name and an unclean merchant name. The payment aggregator model implements an LSTM classifier with character level encodings.

As shown in the FIG. 5B, the payment aggregator model includes a character level encoder 524, a first LSTM layer 526, a second LSTM layer 528, an attention layer 530, and a softmax layer 532. The character level encoder 524 takes input data string 522 (e.g., PAYPAL*25MAY) and converts the data string into three-dimensional representations using character-level encoding methods. The first LSTM layer 526 and the second LSTM layer 528 are configured to take the three-dimensional representations of various data strings to learn hidden characteristics corresponding to cleansed and uncleansed merchant names. The attention layer 530 is utilized for defining weights corresponding to earlier characters for predicting the next characters for each data string. The softmax layer 532 is configured to generate a probability value corresponding to the input data string as an output 534. The probability value nearer to '1' (i.e., classified into class '1') indicates that the second part of the data string has junk information and the cleansed merchant name is the first part (e.g., PAYPAL) of the data string. The probability value nearer to '0' (i.e., classified into class '0') indicates that the second part of the data string is the cleansed merchant name corresponding to the data string. The following table depicts the results of the payment aggregator model provided with various data strings:

TABLE 4

| Unclean Merchant Name | Score | Actual Output | Predicted Output |
| --- | --- | --- | --- |
| PAYPAL *MIKEGENEREU | 0.00016 | 0 | 0 |
| PAYPAL *MIKEGINTZ | 0.000185 | 0 | 0 |
| PAYPAL *uicsiu4536 | 0.005713 | 0 | 0 |
| PAYPAL *ud%%#$ | 0.276462 | 1 | 1 |
| PAYPAL *SINGH | 0.000332 | 0 | 0 |
| PAYPAL *Xu | 0.984803 | 1 | 1 |
| PAYPAL *INDIA | 0.00057 | 0 | 0 |
| PAYPAL *AAAAAA | 0.999913 | 1 | 1 |
| PAYPAL *UBER In | 0.000625 | 0 | 0 |
| PAYPAL *UBER TECH Inc. | 0.000224 | 0 | 0 |
| PAYPAL *aVJrR0e | 0.999831 | 1 | 1 |
| PAYPAL *dominos | 0.000266 | 0 | 0 |

Figure 6A:
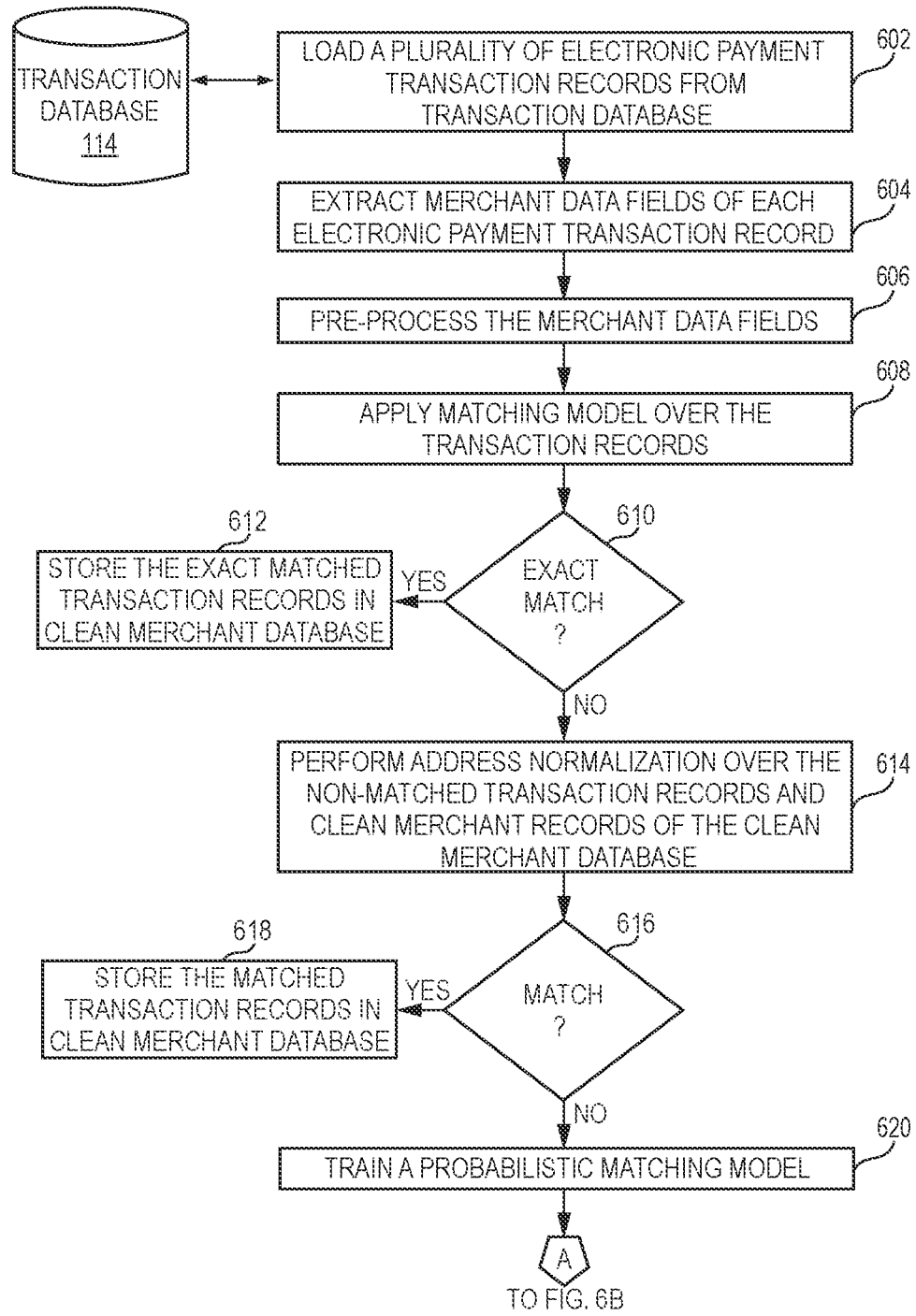
FIGS. 6A, 6B and 6C, collectively, represent a flow chart of a process flow for updating merchant information of electronic payment transaction records using one or more data models, in accordance with an example embodiment of the present disclosure.
Figure 6B:
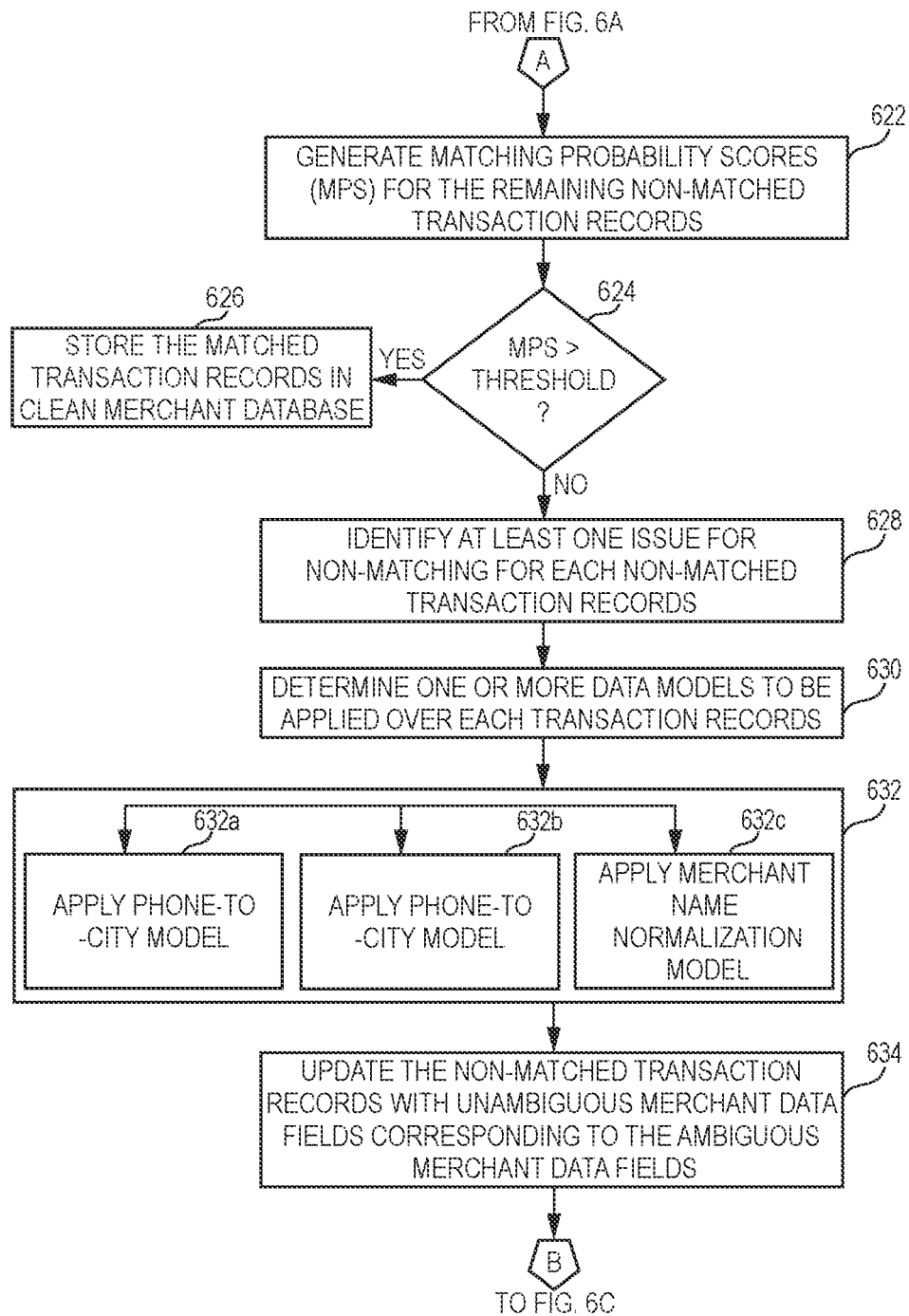
Figure 6C:
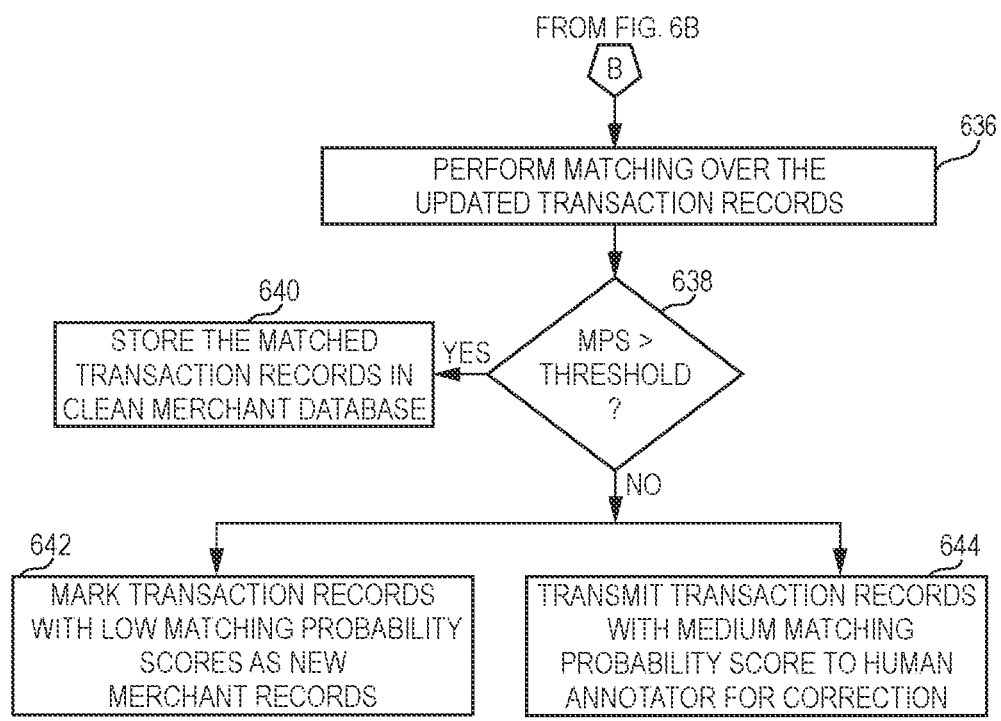

FIGS. 6A, 6B and 6C, collectively, represent a flow chart 600 of a process flow for updating merchant information of electronic payment transaction records using one or more data models, in accordance with an example embodiment of the present disclosure. The sequence of operations of the flow chart 600 may not be necessarily executed in the same order as they are presented. Further, one or more operations may be grouped and performed in form of a single step, or one operation may have several sub-steps that may be performed in parallel or in a sequential manner.

At 602, the server system 200 loads a plurality of electronic payment transaction records (e.g., R1, R2, R3, R4, R5) from the transaction database 114. The plurality of electronic payment transaction records may be loaded in a temporary data storage. Each electronic payment transaction record is associated with a merchant of a plurality of merchants. These electronic payment transaction records are received from one or more acquirers (e.g., the acquirer 102).

At 604, the server system 200 extracts merchant data fields of each electronic payment transaction record. The merchant data fields may include categorical data and/or numerical data. The merchant data fields include, but are not limited to, data elements including information of merchant name, merchant acquirer identifier, merchant address, merchant city, merchant zip, merchant state code, and merchant country, etc. An example of an electronic payment transaction record $R_1$ is as follows:

TABLE 5

| MERCHANT_DBA_NAME | STREET_ADDR | CITY_NAME | POSTAL_CODE |
| --- | --- | --- | --- |
| Spotify USA | 45 west 18$^{th}$ Street | 646-8375380 | 10011 |

At 606, the server system 200 pre-processes merchant data fields of each electronic payment transaction record to obtain standardized merchant data fields. In particular, the server system 200 pre-processes the plurality of electronic payment transaction records based on a predefined ruleset.

At 608, the server system 200 applies a matching model (i.e., an adaptive blocking algorithm) over the plurality of electronic transaction records. The server system 200 directly matches each of the plurality of electronic payment transaction records ($R_1, R_2, \ldots, R_n$) to at least one candidate merchant record in the clean merchant database 116. In general, the merchant data fields in the electronic payment transaction record $R_1$ are matched to the corresponding data element/attribute associated with at least one candidate merchant record ($C_1$) in the clean merchant database 116. More specifically, the server system 200 is configured to search a candidate merchant record in the clean merchant database that is similar to the one or more merchant data fields in the electronic payment transaction record.

At 610, the server system 200 finds the electronic payment transaction records with an exact match with clean merchant records stored in the clean merchant database 116. At 612, the server system 200 stores the exact matched electronic payment transaction records into the clean merchant database 116 for the next run of the process.

At 614, the server system 200 performs an address normalization over the non-matched transaction records and clean merchant records stored in the clean merchant database 116. Because of the address normalization, address fields of non-matched transaction records and clean merchant records are in a standard form that may help to find more exact matches with entities stored in the clean merchant database 116.

At 616, after address normalization, the server system 200 matches the non-matched transaction records with clean merchant records stored in the clean merchant database 116. At 618, the server system 200 stores the matched electronic payment transaction records into the clean merchant database 116 for the next run of the process.

At 620, the server system 200 trains a probabilistic matching model in a semi-supervised manner. The probabilistic matching model implements a regularized logistic regression model. During training, some possible matching pairs identified during the matching steps are provided to a data analyst based on marginal sampling who labels each matching pair. Thus, the regularized logistic regression model is trained to provide a matching probability score for each of the matching pairs. The matching probability score is a measure of similarity between the electronic payment transaction record (e.g., $R_1$) and the candidate merchant record. More particularly, the matching probability score is determined for each of the plurality of electronic payment transaction records based on the set of matching features associated with each of the plurality of electronic payment transaction records.

At 622, the server system 200 generates matching probability scores for the remaining non-matched transaction records after the second match (see, step 616) using the probabilistic matching model.

At 624, the server system 200 identifies transaction records having matching probability scores greater than a predetermined threshold value. At 626, the server system 200 stores those transaction records to the clean merchant database 116.

At 628, the server system 200 identifies at least one issue for non-matching for each non-matched transaction record. At least one issue may be due to field switching, payment aggregators sending incorrect addresses, phone numbers populated in the city name field, incorrect merchant name, etc.

At 630, the server system 200 determines one or more data models to be applied over each transaction records based on the identified issues.

At 632, the server system 200 applies one or more data models for updating ambiguous merchant data fields corresponding to each transaction record. In one example scenario, a payment transaction record from the set of electronic payment transaction records has phone number (e.g., 6574454005) in city name field and merchant name (e.g., PAYPAL*UBER In). In this scenario, server system 200 is configured to apply phone-to-city model as well as a payment aggregator model for correcting the merchant name and city name.

At 632a, the server system 200 applies phone-to-city model for predicting city name with a prediction score for a city name field of a transaction record "A" that is populated with phone number of a merchant of the transaction record A. If the prediction score corresponding to the predicted city name is greater than the threshold value, the server system 200 updates the city name field of the transaction record "A" with the predicted city name.

At 632b, the server system 200 applies the payment aggregator model for determining a clean merchant name for a transaction record "B" in which the merchant name field is populated by the payment aggregator with ambiguous data. The payment aggregator model helps in determining the correct merchant name for the transaction record "B".

At 632c, the server system 200 applies the merchant name normalization model for determining an aggregate merchant name for a transaction record "C" in which the merchant name field includes an ambiguous merchant name.

At 634, the server system 200 updates merchant data fields of the non-matched transaction records based on the application of one or more data models.

At 636, the server system 200 again performs matching over the updated transaction records modified in steps 632a-632c with candidate merchant records of the clean merchant database 116.

At 638, the server system 200 checks matching probability scores corresponding to the updated transaction records. At 640, the server system 200 stores transaction records having matching probability scores greater than the predicting threshold value.

At 642, the server system 200 marks transaction records with low matching probability scores as new merchant records and takes the help of a human annotator to assign new merchant identifiers corresponding to the new merchant records. These new merchant records are stored in the clean merchant database 116 after basic data cleansing for the next run of the process.

At 644, the server system 200 transmits transaction records with medium probability scores to a human annotator to check whether the transaction records are associated with existing merchant data fields (e.g., locations) or not. In one example, if a transaction record is associated with an existing location, the human annotator updates merchant data fields of the transaction record before storing. In case, if a transaction record is not associated with any existing locations, the human annotator assigns a new merchant identifier to the transaction record and stores the transaction record with the new merchant identifier in the clean merchant database 116.

The sequence of operations of the flow chart 600 need not be necessarily executed in the same order as they are presented. Further, one or more operations may be grouped and performed in the form of a single step, or one operation may have several sub-steps that may be performed in a parallel or sequential manner.

Figure 7:
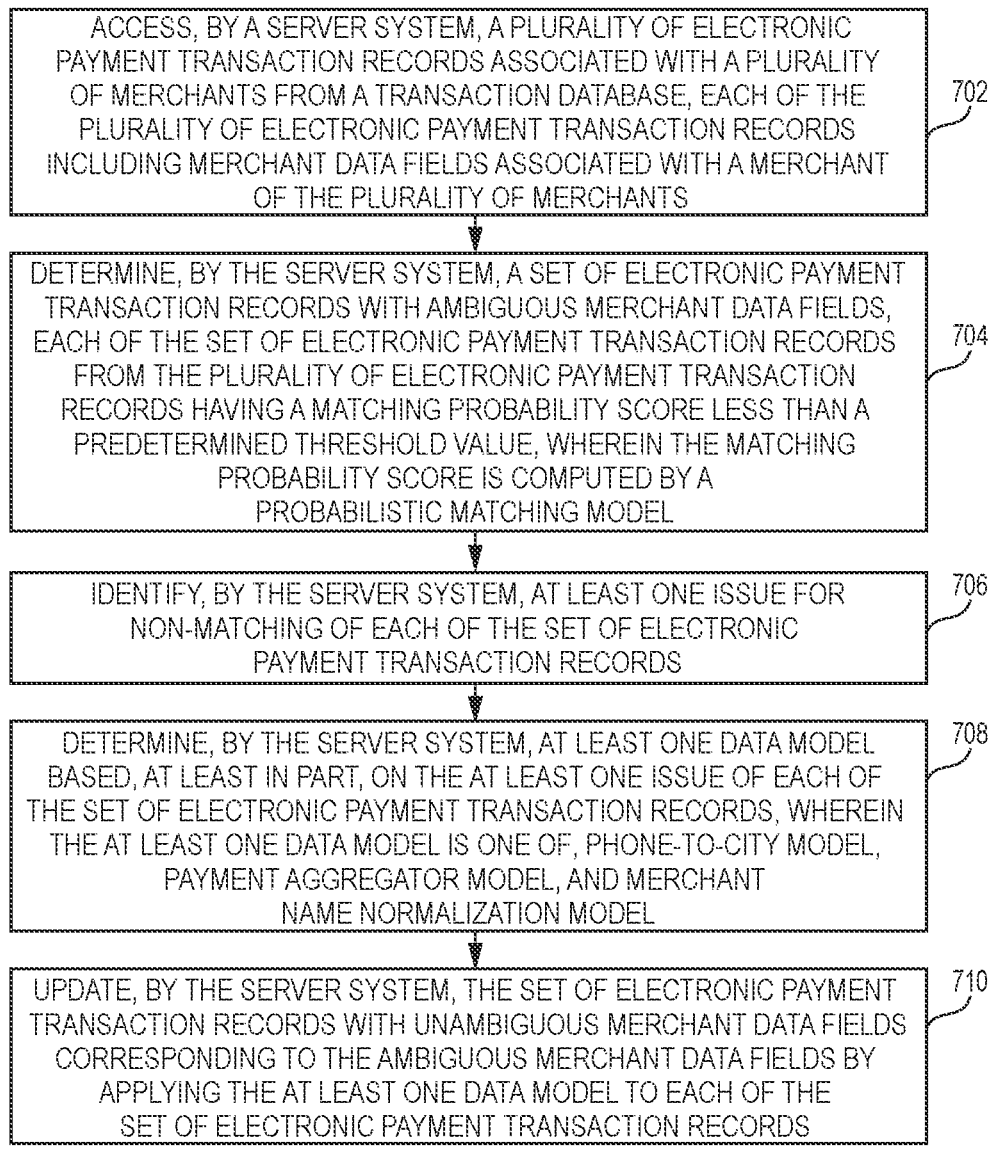
FIG. 7 represents a flow diagram of a computer-implemented method for updating merchant information of electronic payment transaction records using one or more data models, in accordance with an example embodiment of the present disclosure.

FIG. 7 represents a flow diagram of a computer-implemented method 700 for updating merchant information of electronic payment transaction records using one or more data models, in accordance with an example embodiment of the present disclosure. The computer-implemented method 700 depicted in the flow diagram may be executed by, the at least one server, for example, the server system 108 or the server system 200 explained with reference to FIG. 2, the payment server 106, or the acquirer server 102. Operations of the flow diagram of the computer-implemented method 700, and combinations of operation in the flow diagram, may be implemented by, for example, hardware, firmware, a processor, circuitry and/or a different device associated with the execution of software that includes one or more computer program instructions. It is noted that the operations of the method 700 can be described and/or practiced by using a system other than these server systems. The method 700 starts at operation 702.

At operation 702, the method 700 includes accessing a plurality of electronic payment transaction records associated with a plurality of merchants 112a-112c from the transaction database 114. Each of the plurality of electronic payment transaction records includes merchant data fields associated with a merchant of the plurality of merchants 112a-112c.

At operation 704, the method 700 includes determining a set of electronic payment transaction records with ambiguous merchant data fields. Each of the set of electronic payment transaction records from the plurality of electronic payment transaction records has a matching probability score less than a predetermined threshold value. The matching probability score is computed by a probabilistic matching model.

At operation 706, the method 700 includes identifying at least one issue for non-matching of each of the set of electronic payment transaction records.

At operation 708, the method 700 includes determining at least one data model based, at least in part, on the at least one issue of each of the set of electronic payment transaction records. The at least one data model is one of: phone-to-city model, payment aggregator model, and merchant name normalization model.

At operation 710, the method 700 includes updating the set of electronic payment transaction records with unambiguous merchant data fields corresponding to the ambiguous merchant data fields by applying the at least one data model to each of the set of electronic payment transaction records.

The sequence of operations of the method 700 need not be necessarily executed in the same order as they are presented. Further, one or more operations may be grouped together and performed in form of a single step, or one operation may have several sub-steps that may be performed in parallel or in sequential manner.

Figure 8:
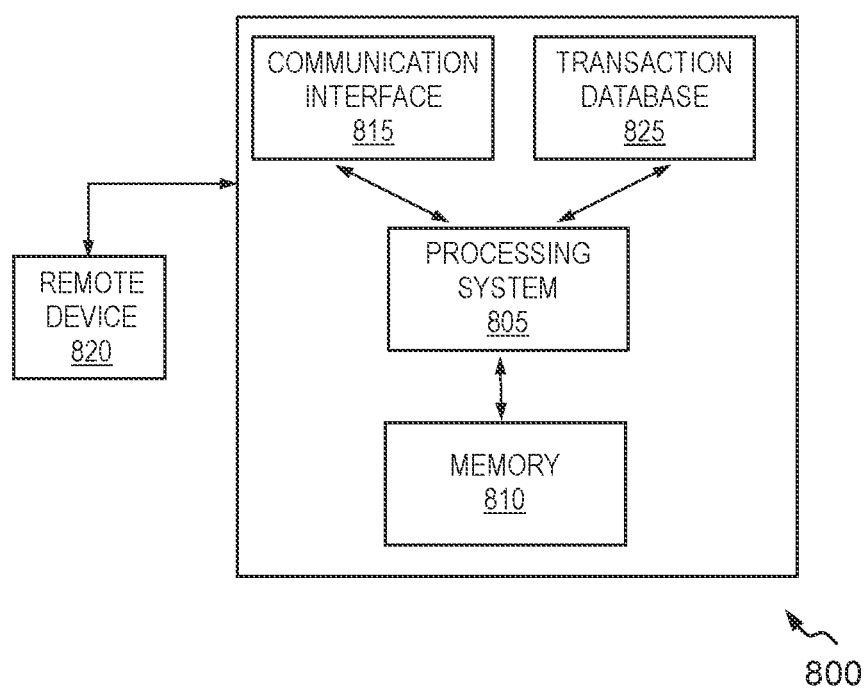
FIG. 8 is a simplified block diagram of a payment server, in accordance with an example embodiment of the present disclosure.

FIG. 8 is a simplified block diagram of a payment server 800, in accordance with an embodiment of the present disclosure. The payment server 800 is an example of the payment server 106 of FIG. 1. The payment network 104 may be used by the payment server 800, the acquirer server 102, and an issuer server as a payment interchange network. Examples of the payment network 104 may include, but not limited to, Mastercard® payment system interchange network. The payment server 800 includes a processing system 805 configured to extract programming instructions from a memory 810 to provide various features of the present disclosure. The components of the payment server 800 provided herein may not be exhaustive and the payment server 800 may include more or fewer components than those depicted in FIG. 8. Further, two or more components may be embodied in one single component, and/or one component may be configured using multiple sub-components to achieve the desired functionalities. Some components of the payment server 800 may be configured using hardware elements, software elements, firmware elements, and/or a combination thereof.

Via a communication interface 815, the processing system 805 receives electronic payment transaction record (i.e., "payment transaction data") from a remote device 820 such as the acquirer server 102. The communication may be achieved through API calls, without loss of generality. The payment server 800 includes a database, such as a transaction database 825. The transaction database 825 may include, but not limited to, payment transaction data, such as Issuer ID, country code, acquirer ID, merchant name, merchant location, etc. In one embodiment, the transaction database 825 stores a plurality of electronic payment transaction records which may include ambiguous instances/entries. The payment server 800 may also perform similar operations as performed by the server system 108 or the server system 200 for updating merchant information of electronic payment transaction records using one or more data models. For the sake of brevity, the detailed explanation of the payment server 800 is omitted herein with reference to the FIGS. 1 and 2.

Figure 9:
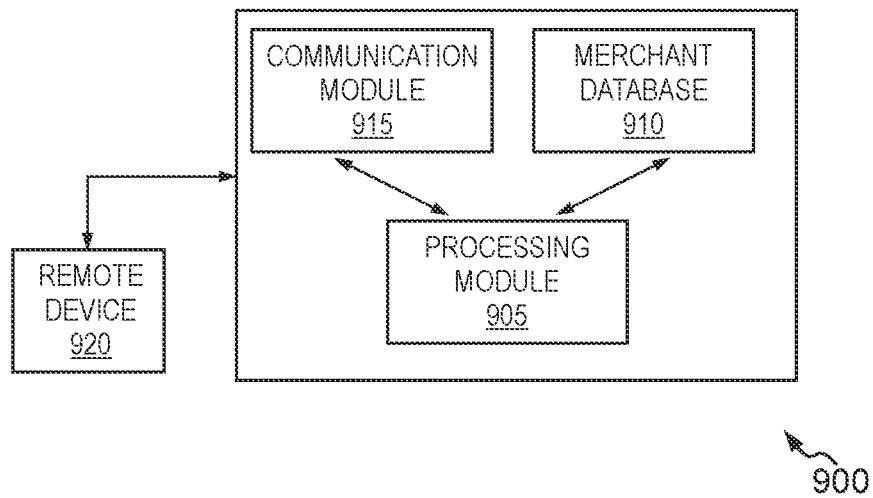
FIG. 9 is a simplified block diagram of an acquirer server, in accordance with an example embodiment of the present disclosure.

FIG. 9 is a simplified block diagram of an acquirer server 900, in accordance with one embodiment of the present disclosure. The acquirer server 900 is associated with an acquirer bank, which may be associated with one or more merchants (e.g., the merchants 112a-112c). The merchant may have established an account to accept payment for the purchase of goods from customers. The acquirer server 900 is an example of the acquirer server 102 of FIG. 1 or may be embodied in the acquirer server 102. Further, the acquirer server 900 is configured to facilitate transactions with an issuer server (not shown) for payment transactions using the payment network 104 of FIG. 1. The acquirer server 900 includes a processing module 905 communicably coupled to a merchant database 910 and a communication module 915. The communication module 915 is configured to receive payment transaction data associated with a payment transaction performed at a merchant terminal. This payment transaction data is stored in the merchant database as electronic payment transaction records and also sent to the payment server 800 via the payment network 104.

The components of the acquirer server 900 provided herein may not be exhaustive, and the acquirer server 900 may include more or fewer components than those depicted in FIG. 9. Further, two or more components may be embodied in one single component, and/or one component may be configured using multiple sub-components to achieve the desired functionalities. Some components of the acquirer server 900 may be configured using hardware elements, software elements, firmware elements, and/or a combination thereof.

Further, the merchant database 910 includes a table which stores one or more merchant parameters, such as, but not limited to, a merchant primary account number (PAN), a merchant name, a merchant ID (MID), a merchant category code (MCC), a merchant city, a merchant postal code, a merchant brand name, industry code, merchant URL, merchant ticket size, terminal identification numbers (TIDs) associated with merchant terminals (e.g., the POS terminals or any other merchant electronic devices) used for processing transactions, among others. The processing module 905 is configured to update unambiguous merchant information of electronic payment transaction records using one or more data models. The processing module 905 may be configured to store and update the merchant parameters in the merchant database 910 for later retrieval. In an embodiment, the communication module 915 is capable of facilitating operative communication with a remote device 920 such as, a merchant terminal, a payment server (e.g., the payment server 800).

The disclosed methods with reference to FIGS. 1 to 9, or one or more operations of the flow chart 600 and the method 700 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components)) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the disclosure has been described with reference to specific exemplary embodiments, it is noted that various modifications and changes may be made to these embodiments without departing from the broad spirit and scope of the disclosure. For example, the various operations, blocks, etc. described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system 200 and its various components such as the computer system and the database may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A computer-implemented method comprising:
   accessing, by a server system, a plurality of electronic payment transaction records associated with a plurality of merchants from a transaction database, each of the plurality of electronic payment transaction records comprising merchant data fields associated with a merchant of the plurality of merchants;
   determining, by the server system, a set of electronic payment transaction records with ambiguous merchant data fields, each of the set of electronic payment transaction records from the plurality of electronic payment transaction records having a matching probability score less than a predetermined threshold value, wherein the matching probability score is computed by a probabilistic matching model;
   identifying, by the server system, at least one issue for non-matching of each of the set of electronic payment transaction records;
   determining, by the server system, at least one data model based, at least in part, on the at least one issue of each of the set of electronic payment transaction records, wherein the at least one data model is one of: phone-to-city model, payment aggregator model, and merchant name normalization model;
   updating, by the server system, the set of electronic payment transaction records having ambiguous merchant data fields with corresponding unambiguous merchant data fields by applying the at least one data model to each of the set of electronic payment transaction records;
   applying, by the server system, the merchant name normalization model over third electronic payment transaction records to determine aggregated merchant names, wherein merchant name fields of the third electronic payment transaction records are populated with ambiguous merchant names, and wherein the merchant name normalization model is based on a transformer neural network model with character level encoding; and
   updating, by the server system, the merchant name fields of the third electronic payment transaction records based on the application of the merchant name normalization model over the third electronic payment transaction records.

2. The computer-implemented method as claimed in claim 1, further comprising:
   pre-processing, by the server system, the plurality of electronic payment transaction records based, at least in part, on a predefined ruleset.

3. The computer-implemented method as claimed in claim 1, wherein the probabilistic matching model is a logistic regression model.

4. The computer-implemented method as claimed in claim 1, wherein the at least one issue is one of: phone number in a city name field, payment aggregators sending the ambiguous merchant data fields, and ambiguous merchant name in merchant name field.

5. The computer-implemented method as claimed in claim 1, further comprising:
   applying, by the server system, the phone-to-city model over first electronic payment transaction records in which city name fields are populated with phone numbers of merchants associated with the first electronic payment transaction records, the phone-to-city model configured to predict city names with prediction scores against the first electronic payment transaction records; and
   updating, by the server system, the city name fields of the first electronic payment transaction records with the predicted city names having prediction scores greater than a threshold value.

6. The computer-implemented method as claimed in claim 1, further comprising:
- applying, by the server system, the payment aggregator model over second electronic payment transaction records in which at least one merchant data field of each second electronic payment transaction record is populated with ambiguous data by payment aggregators, wherein the payment aggregator model comprises Long Short Term Memory (LSTM) neural network with character level encoding; and
- updating, by the server system, the at least merchant data field of each second payment transaction records based on the application of the payment aggregator model over the second electronic payment transaction records.

7. The computer-implemented method as claimed in claim 1, further comprising:
- storing, by the server system, the updated set of electronic payment transaction records into the clean merchant database.

8. The computer-implemented method as claimed in claim 1, wherein the merchant data fields are at least one or more of:
- merchant name,
- acquirer merchant identifier,
- merchant address,
- merchant city,
- merchant zip code,
- merchant state code, and
- merchant country.

9. A server system comprising:
- a communication interface; and
- a processor coupled to the communication interface, the processor configured to
  - access a plurality of electronic payment transaction records associated with a plurality of merchants from a transaction database, each of the plurality of electronic payment transaction records comprising merchant data fields associated with a merchant of the plurality of merchants;
  - determine a set of electronic payment transaction records with ambiguous merchant data fields, each of the set of electronic payment transaction records from the plurality of electronic payment transaction records having a matching probability score less than a predetermined threshold value, wherein the matching probability score is computed by a probabilistic matching model;
  - identify at least one issue for non-matching of each of the set of electronic payment transaction records;
  - determine at least one data model based, at least in part, on the at least one issue of each of the set of electronic payment transaction records, wherein the at least one data model is one of: phone-to-city model, payment aggregator model, and merchant name normalization model;
  - update the set of electronic payment transaction records having ambiguous merchant data fields with corresponding unambiguous merchant data fields by applying the at least one data model to each of the set of electronic payment transaction records;
  - apply the merchant name normalization model over third electronic payment transaction records to determine aggregated merchant names, wherein merchant name fields of the third electronic payment transaction records are populated with ambiguous merchant names, and wherein the merchant name normalization model is based on a transformer neural network model with character level encoding; and
  - update, by the server system, the merchant name fields of the third electronic payment transaction records based on the application of the merchant name normalization model over the third electronic payment transaction records.

10. The server system of claim 9, wherein the processor is further configured to:
- pre-process the plurality of electronic payment transaction records based, at least in part, on a predefined ruleset.

11. The server system of claim 9, wherein the probabilistic matching model is a logistic regression model.

12. The server system of claim 9, wherein the at least one issue is one of: phone number in a city name field, payment aggregators sending the ambiguous merchant data fields, and ambiguous merchant name in merchant name field.

13. The server system of claim 9, wherein the processor is further configured to:
- apply the phone-to-city model over first electronic payment transaction records in which city name fields are populated with phone numbers of merchants associated with the first electronic payment transaction records, the phone-to-city model configured to predict city names with prediction scores against the first electronic payment transaction records; and
- update the city name fields of the first electronic payment transaction records with the predicted city names having prediction scores greater than a threshold value.

14. The server system of claim 9, wherein the processor is further configured to:
- apply the payment aggregator model over second electronic payment transaction records in which at least one merchant data field of each second electronic payment transaction record is populated with ambiguous data by payment aggregators, wherein the payment aggregator model comprises Long Short Term Memory (LSTM) neural network with character level encoding; and
- update the at least merchant data field of each second payment transaction records based on the application of the payment aggregator model over the second electronic payment transaction records.

15. The server system of claim 9, wherein the processor is further configured to:
- store the updated set of electronic payment transaction records into the clean merchant database.

\* \* \* \* \*